US012621879B2

(12) United States Patent (10) Patent No.: US 12,621,879 B2
Paladugu et al. (45) Date of Patent: May 5, 2026

(54) DUAL-CONNECTIVITY ARCHITECTURE AND SETUP PROCEDURES

(71) Applicant: QUALCOMM Incorporated, San Diego, CA (US)

(72) Inventors: Karthika Paladugu, Hyderabad (IN); Gavin Bernard Horn, La Jolla, CA (US); Hong Cheng, Basking Ridge, NJ (US); Peng Cheng, Beijing (CN); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 18/287,868

(22) PCT Filed: Jun. 7, 2021

(86) PCT No.: PCT/CN2021/098548
§ 371 (c)(1),
(2) Date: Oct. 20, 2023

(87) PCT Pub. No.: WO2022/256953
PCT Pub. Date: Dec. 15, 2022

(65) Prior Publication Data
US 2024/0196449 A1 Jun. 13, 2024

(51) Int. Cl.
*H04W 88/04* (2009.01)
*H04W 76/10* (2018.01)
(52) U.S. Cl.
CPC ............ *H04W 76/10* (2018.02); *H04W 88/04* (2013.01)
(58) Field of Classification Search
CPC .............................. H04W 76/10; H04W 88/04
(Continued)

(56) References Cited

U.S. PATENT DOCUMENTS

2018/0227282 A1* 8/2018 Lee ....................... H04W 12/10
2018/0255499 A1 9/2018 Loehr et al.
(Continued)

FOREIGN PATENT DOCUMENTS

CN 105580451 A 5/2016
WO 2018004278 A1 1/2018

OTHER PUBLICATIONS

International Search Report and Written Opinion—PCT/CN2021/098548—ISA/EPO—Feb. 24, 2022.
(Continued)

*Primary Examiner* — Christopher R Crompton
(74) *Attorney, Agent, or Firm* — Procopio, Cory, Hargreaves & Savitch LLP

(57) ABSTRACT

A remote UE may detect one or more relay UEs for a dual connectivity configuration for communication with a first network entity and a second network entity. The dual connectivity configuration may include a primary connection with the first network entity and a secondary connection with the second network entity. The remote UE may receive, from the first network entity, a configuration for establishing the secondary connection via one of the one or more relay UEs based on a decision at the first network entity. The remote UE may establish the secondary connection via the one of the one or more relay UEs for communication with the second network entity. The remote UE may configure one or more second bearers for the secondary connection via the one of the one or more relay UEs. The one or more second bearers may support data transmission via the secondary connection.

30 Claims, 23 Drawing Sheets

(58) Field of Classification Search
USPC .......................................................... 370/315
See application file for complete search history.

(56) References Cited

U.S. PATENT DOCUMENTS

| 2020/0092928 | A1 | | 3/2020 | Shi et al. |
| 2022/0330352 | A1* | 10/2022 | Horn | ................... H04L 63/0281 |

OTHER PUBLICATIONS

Supplementary European Search Report—EP21944469—Search Authority—Berlin—Jan. 17, 2025.

* cited by examiner

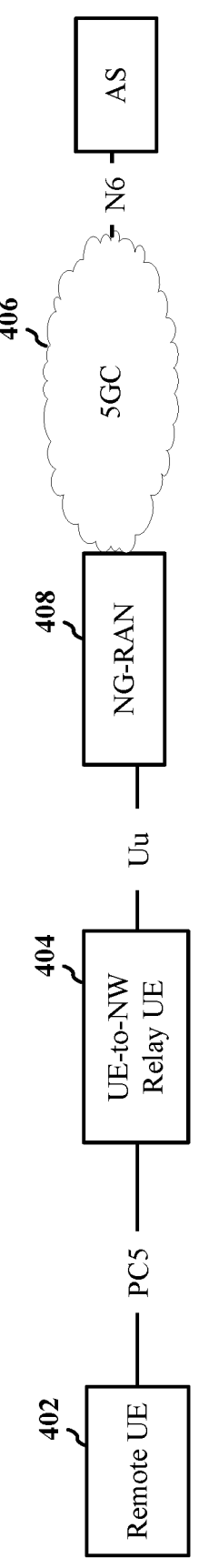
FIG. 4

700A

700B

900B

Relay + Relay Dual Connectivity

NGC

UP Functions

CP Functions

N3

N3

N2 gNB-CU gNB-CU

Xn

Uu

Uu

904b

904a

902

Relay UE2

Relay UE1

PC5 or non-3GPP RAT (Wi-Fi/BT)

PC5 or non-3GPP RAT (Wi-Fi/BT)

Remote UE

N1

900A

Uu + Relay Dual Connectivity

NGC

UP Functions

CP Functions

N3

N3

N2 gNB-CU gNB-CU

Xn

Uu

Uu

904

902

Relay UE

PC5 or non-3GPP RAT (Wi-Fi/BT)

Remote UE

N1

1200

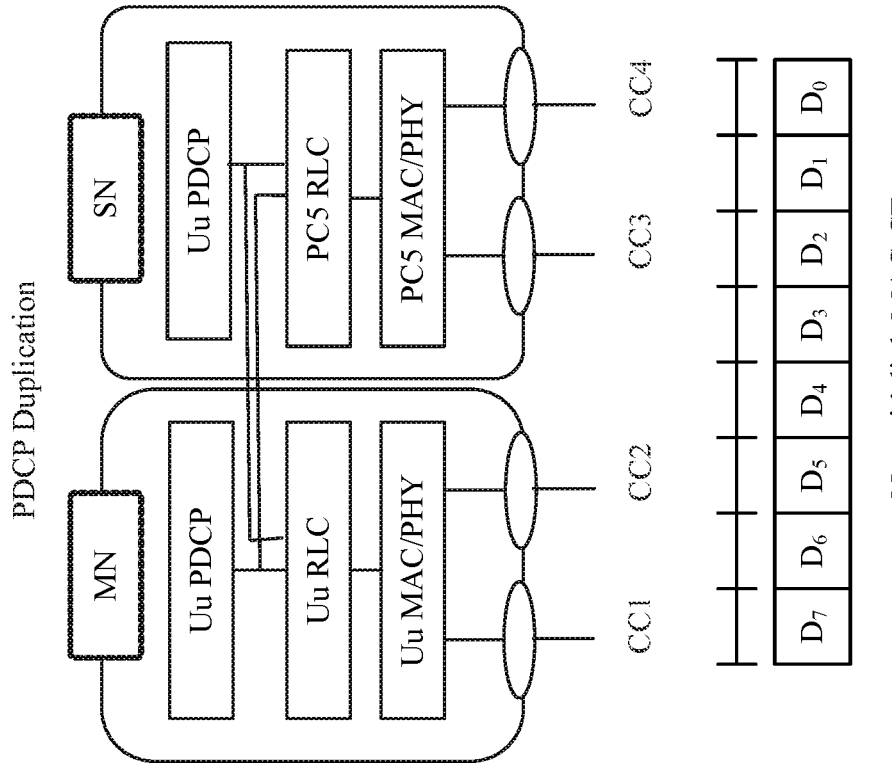
FIG. 17

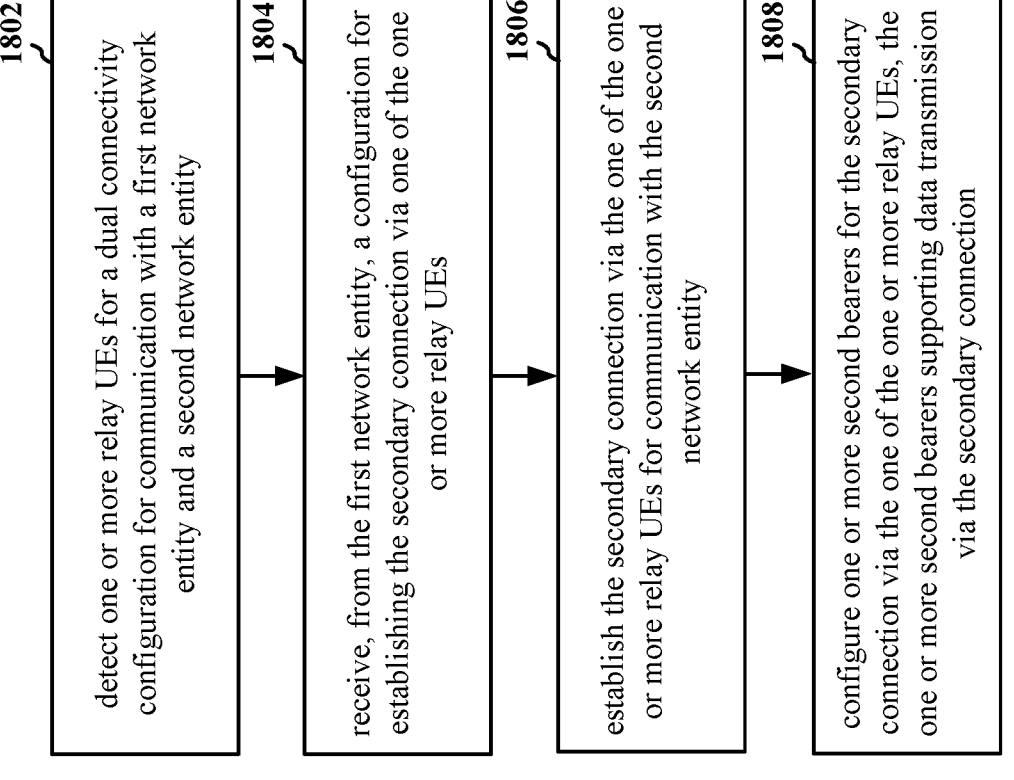

1802 detect one or more relay UEs for a dual connectivity configuration for communication with a first network entity and a second network entity

1804 receive, from the first network entity, a configuration for establishing the secondary connection via one of the one or more relay UEs

1806 establish the secondary connection via the one of the one or more relay UEs for communication with the second network entity

1808 configure one or more second bearers for the secondary connection via the one of the one or more relay UEs, the one or more second bearers supporting data transmission via the secondary connection

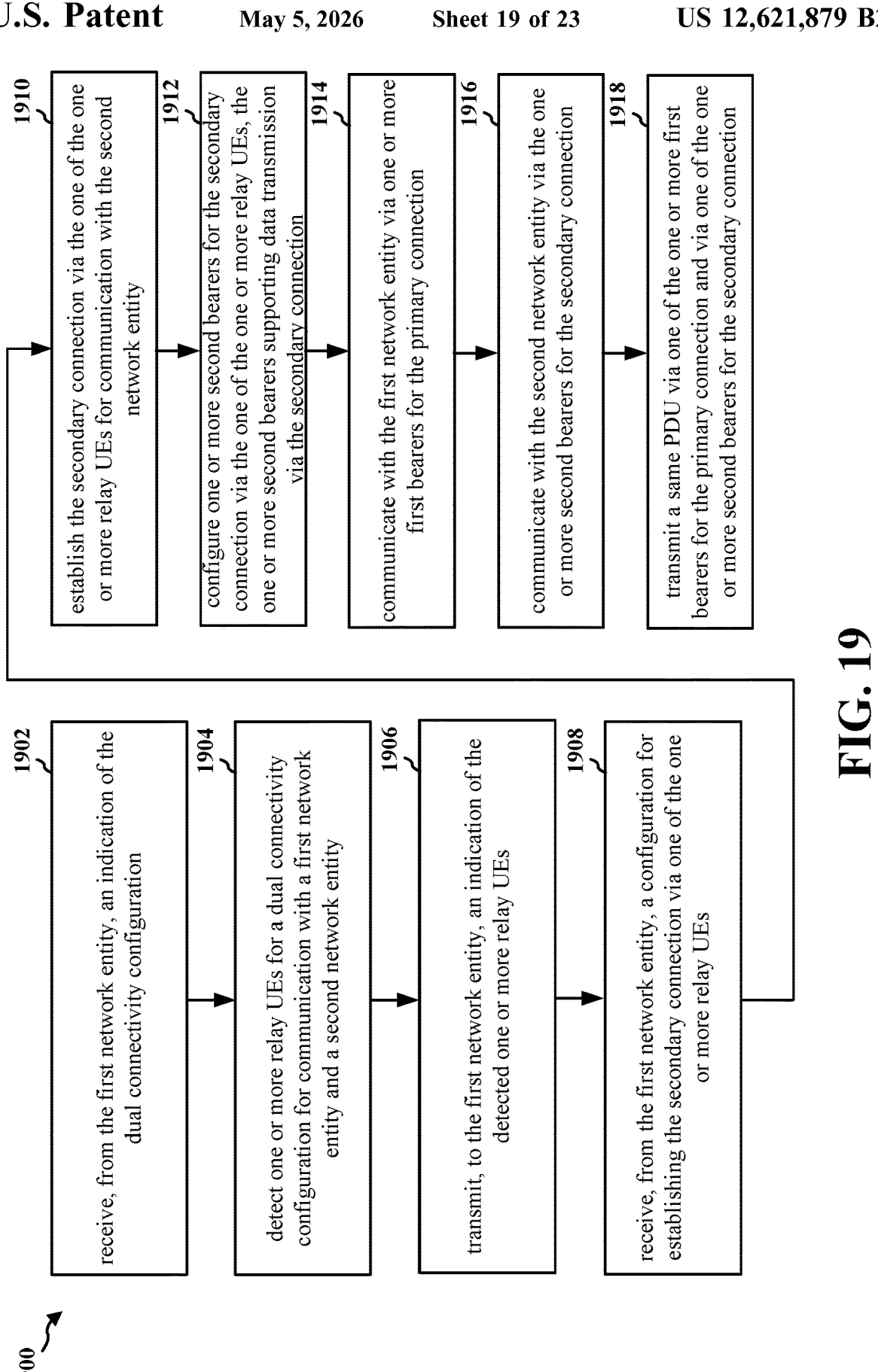

1902 receive, from the first network entity, an indication of the dual connectivity configuration 1904 detect one or more relay UEs for a dual connectivity configuration for communication with a first network entity and a second network entity 1906 transmit, to the first network entity, an indication of the detected one or more relay UEs 1908 receive, from the first network entity, a configuration for establishing the secondary connection via one of the one or more relay UEs 1910 establish the secondary connection via the one of the one or more relay UEs for communication with the second network entity 1912 configure one or more second bearers for the secondary connection via the one of the one or more relay UEs, the one or more second bearers supporting data transmission via the secondary connection 1914 communicate with the first network entity via one or more first bearers for the primary connection 1916 communicate with the second network entity via the one or more second bearers for the secondary connection 1918 transmit a same PDU via one of the one or more first bearers for the primary connection and via one of the one or more second bearers for the secondary connection

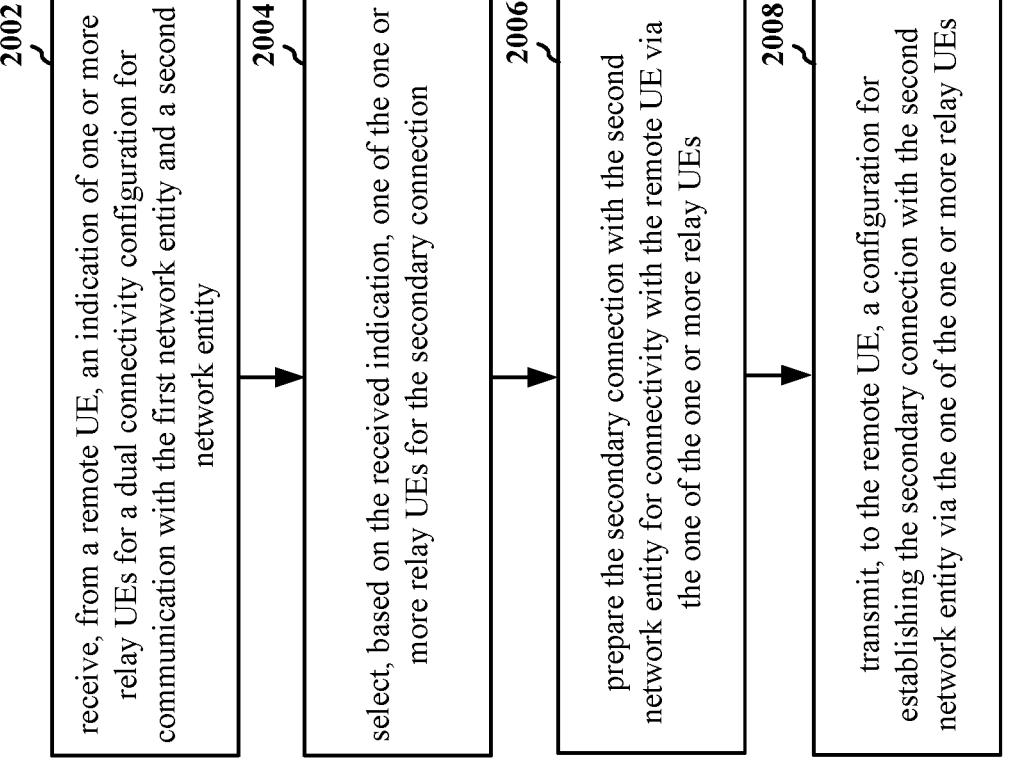

2002 receive, from a remote UE, an indication of one or more relay UEs for a dual connectivity configuration for communication with the first network entity and a second network entity

2004 select, based on the received indication, one of the one or more relay UEs for the secondary connection

2006 prepare the secondary connection with the second network entity for connectivity with the remote UE via the one of the one or more relay UEs

2008 transmit, to the remote UE, a configuration for establishing the secondary connection with the second network entity via the one of the one or more relay UEs

2110 / 2110a transmit a secondary connection configuration to the second network entity 2110b receive a confirmation of the secondary connection confirmation from the second network entity

2112 transmit, to the remote UE, a configuration for establishing the secondary connection with the second network entity via one of the one or more relay UEs

2114 communicate with the remote UE via one or more first bearers for the primary connection

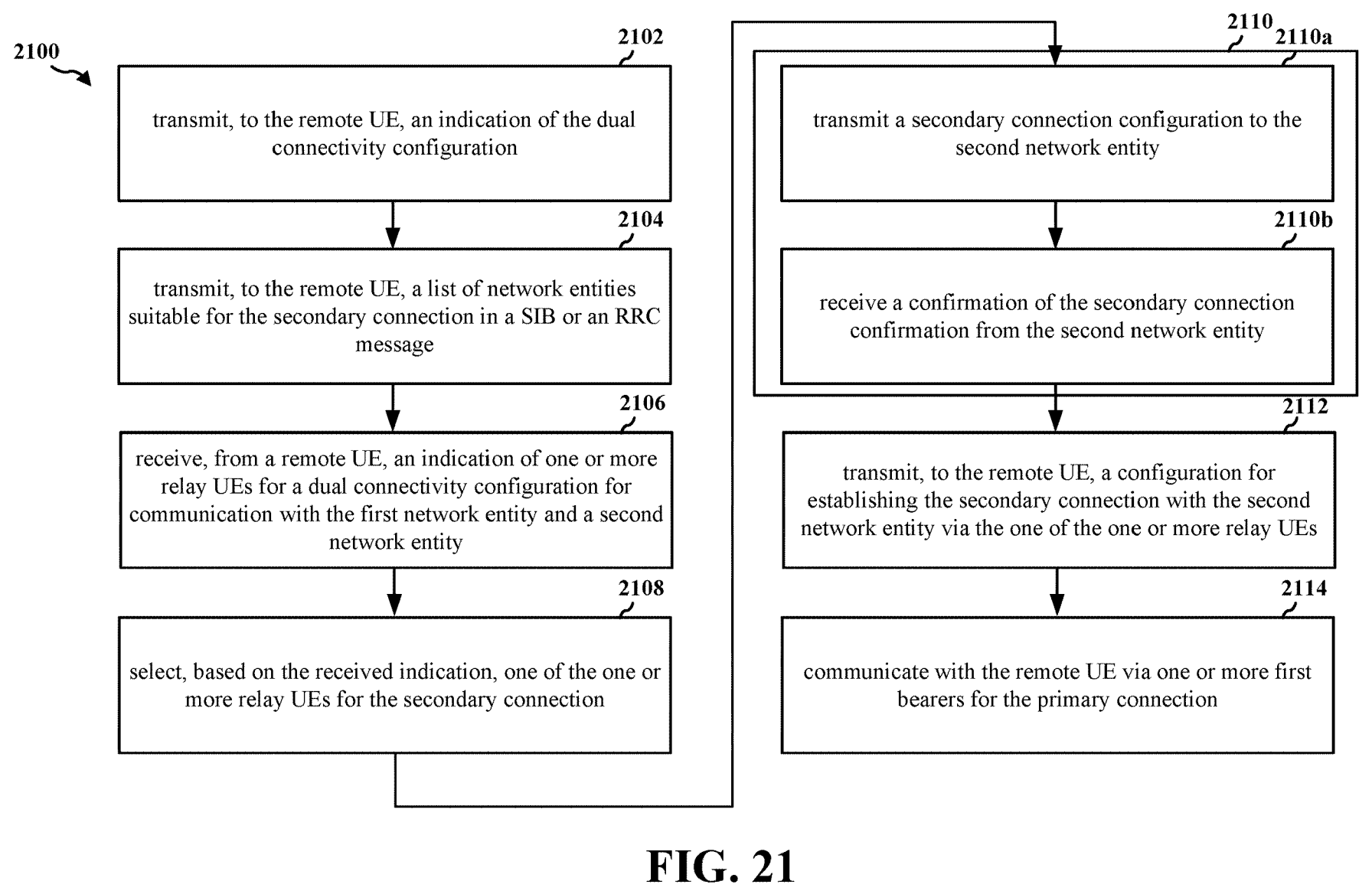

2100

2102 transmit, to the remote UE, an indication of the dual connectivity configuration

2104 transmit, to the remote UE, a list of network entities suitable for the secondary connection in a SIB or an RRC message

2106 receive, from a remote UE, an indication of one or more relay UEs for a dual connectivity configuration for communication with the first network entity and a second network entity

2108 select, based on the received indication, one of the one or more relay UEs for the secondary connection

FIG. 21

DUAL-CONNECTIVITY ARCHITECTURE AND SETUP PROCEDURES

CROSS REFERENCE TO RELATED APPLICATION(S)

This application is National Stage Application filed under 35 U.S.C. § 371 of PCT International Application Serial No. PCT/CN2021/098548 entitled "DUAL-CONNECTIVITY ARCHITECTURE AND SETUP PROCEDURES" and filed on Jun. 7, 2021, which is expressly incorporated by reference herein in its entirety.

TECHNICAL FIELD

The present disclosure relates generally to communication systems, and more particularly, to dual connectivity and user equipment (UE)-to-network relays.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a remote user equipment (UE). The apparatus may detect one or more relay UEs for a dual connectivity configuration for communication with a first network entity and a second network entity. The dual connectivity configuration may include a primary connection with the first network entity and a secondary connection with the second network entity. The apparatus may receive, from the first network entity, a configuration for establishing the secondary connection via one of the one or more relay UEs. The apparatus may establish the secondary connection via the one of the one or more relay UEs for communication with the second network entity. The apparatus may configure one or more second bearers for the secondary connection via the one of the one or more relay UEs. The one or more second bearers may support data transmission via the secondary connection.

In an aspect of the disclosure, a method, a computer-readable medium, and an apparatus are provided. The apparatus may be a first network entity. The apparatus may receive, from a remote UE, an indication of one or more relay UEs for a dual connectivity configuration for communication with the first network entity and a second network entity. The dual connectivity configuration may include a primary connection with the first network entity and a secondary connection with the second network entity. The apparatus may select, based at least on the received indication, one of the one or more relay UEs for the secondary connection. The apparatus may prepare the secondary connection with the second network entity for connectivity with the remote UE via the one of the one or more relay UEs. The apparatus may transmit, to the remote UE, a configuration for establishing the secondary connection with the second network entity via the one of the one or more relay UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a block diagram illustrating an example UE-to-network relay architecture.

FIG. 17 is a diagram illustrating duplication associated with dual connectivity.

FIG. 18 is a flowchart of a method of wireless communication.

FIG. 19 is a flowchart of a method of wireless communication.

FIG. 20 is a flowchart of a method of wireless communication.

FIG. 21 is a flowchart of a method of wireless communication.

DETAILED DESCRIPTION

Figure 1:
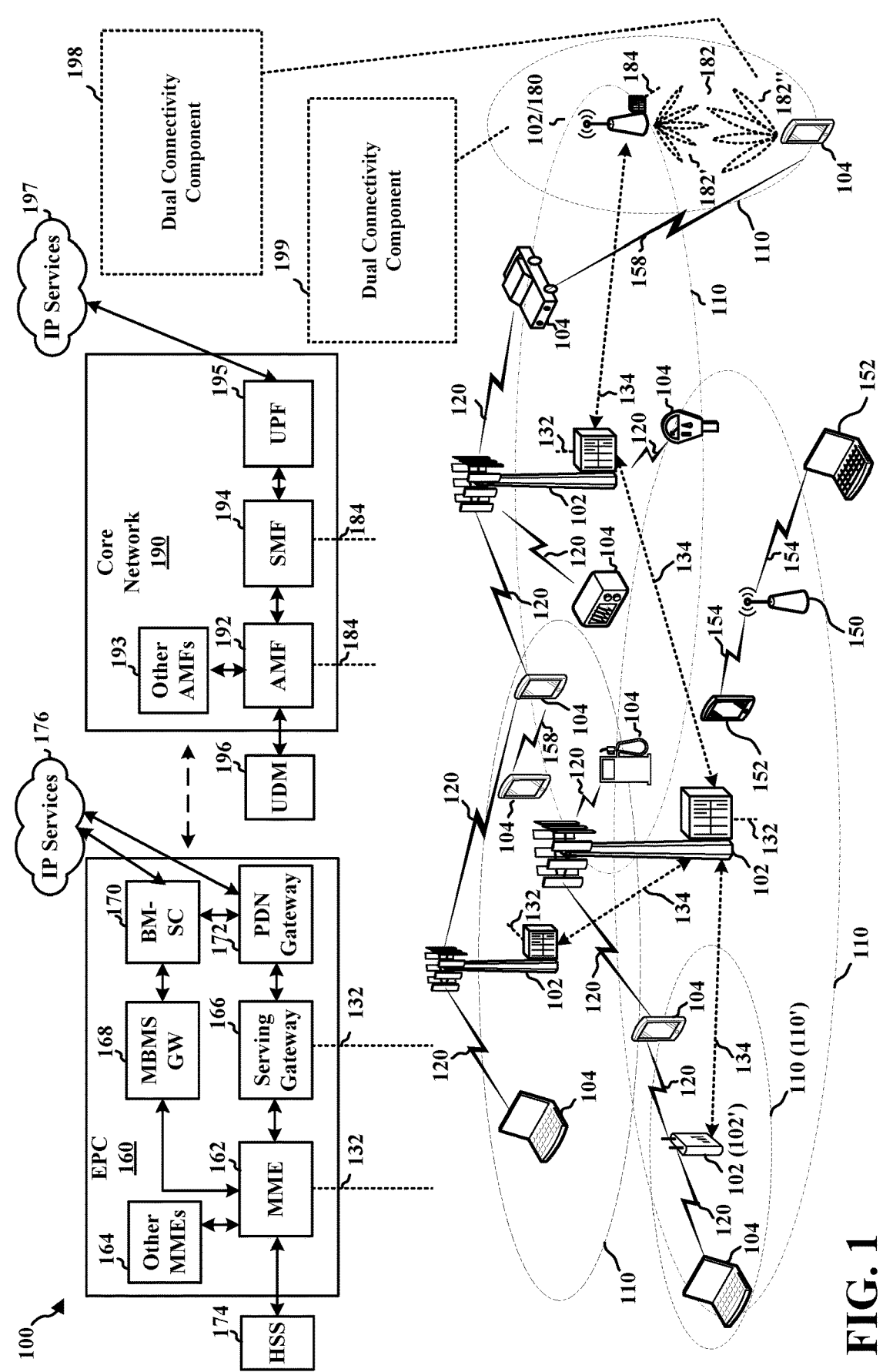
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHZ-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QOS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the remote UE 104 may include a dual connectivity component 198 that may be configured to detect one or more relay UEs for a dual connectivity configuration for communication with a first network entity and a second network entity. The dual connectivity configuration may include a primary connection with the first network entity and a secondary connection with the second network entity. The dual connectivity component 198 may be configured to receive, from the first network entity, a configuration for establishing the secondary connection via one of the one or more relay UEs. The dual connectivity component 198 may be configured to establish the secondary connection via the one of the one or more relay UEs for communication with the second network entity. The dual connectivity component 198 may be configured to configure one or more second bearers for the secondary connection via the one of the one or more relay UEs. The one or more second bearers may support data transmission via the secondary connection. In certain aspects, the base station/first network entity 180 may include a dual connectivity component 199 that may be configured to receive, from a remote UE, an indication of one or more relay UEs for a dual connectivity configuration for communication with the first network entity and a second network entity. The dual connectivity configuration may include a primary connection with the first network entity and a secondary connection with the second network entity. The dual connectivity component 199 may be configured to select, based at least on the received indication, one of the one or more relay UEs for the secondary connection. The dual connectivity component 199 may be configured to prepare the secondary connection with the second network entity for connectivity with the remote UE via the one of the one or more relay UEs. The dual connectivity component 199 may be configured to transmit, to the remote UE, a configuration for establishing the secondary connection with the second network entity via the one of the one or more relay UEs. Although the following description may be focused on 5G NR, the concepts described herein may be applicable to other similar areas, such as LTE, LTE-A, CDMA, GSM, and other wireless technologies.

Figures 2A, 2B, 2C, 2D:
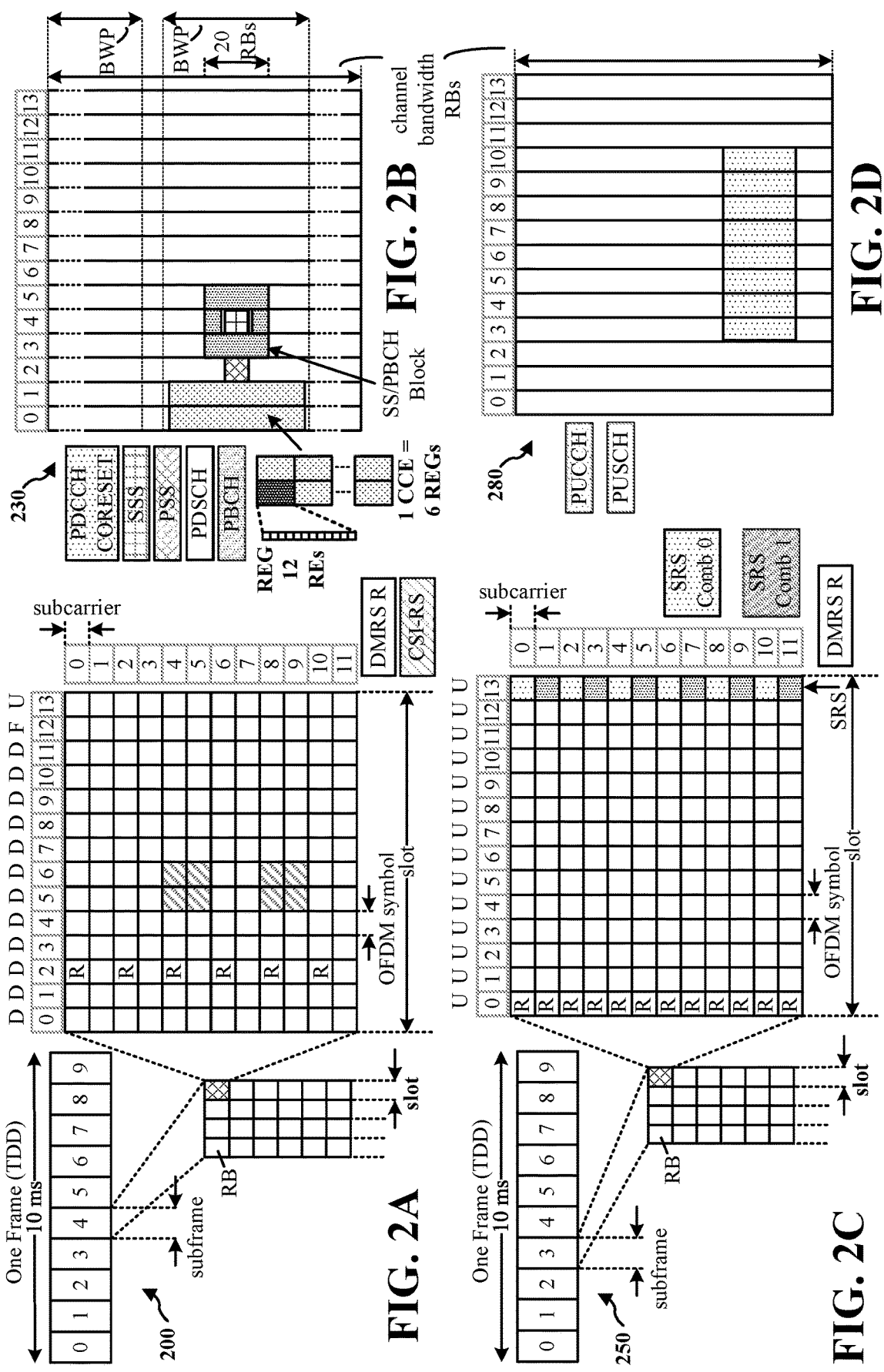
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe. The subcarrier spacing may be equal to $2^\mu*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
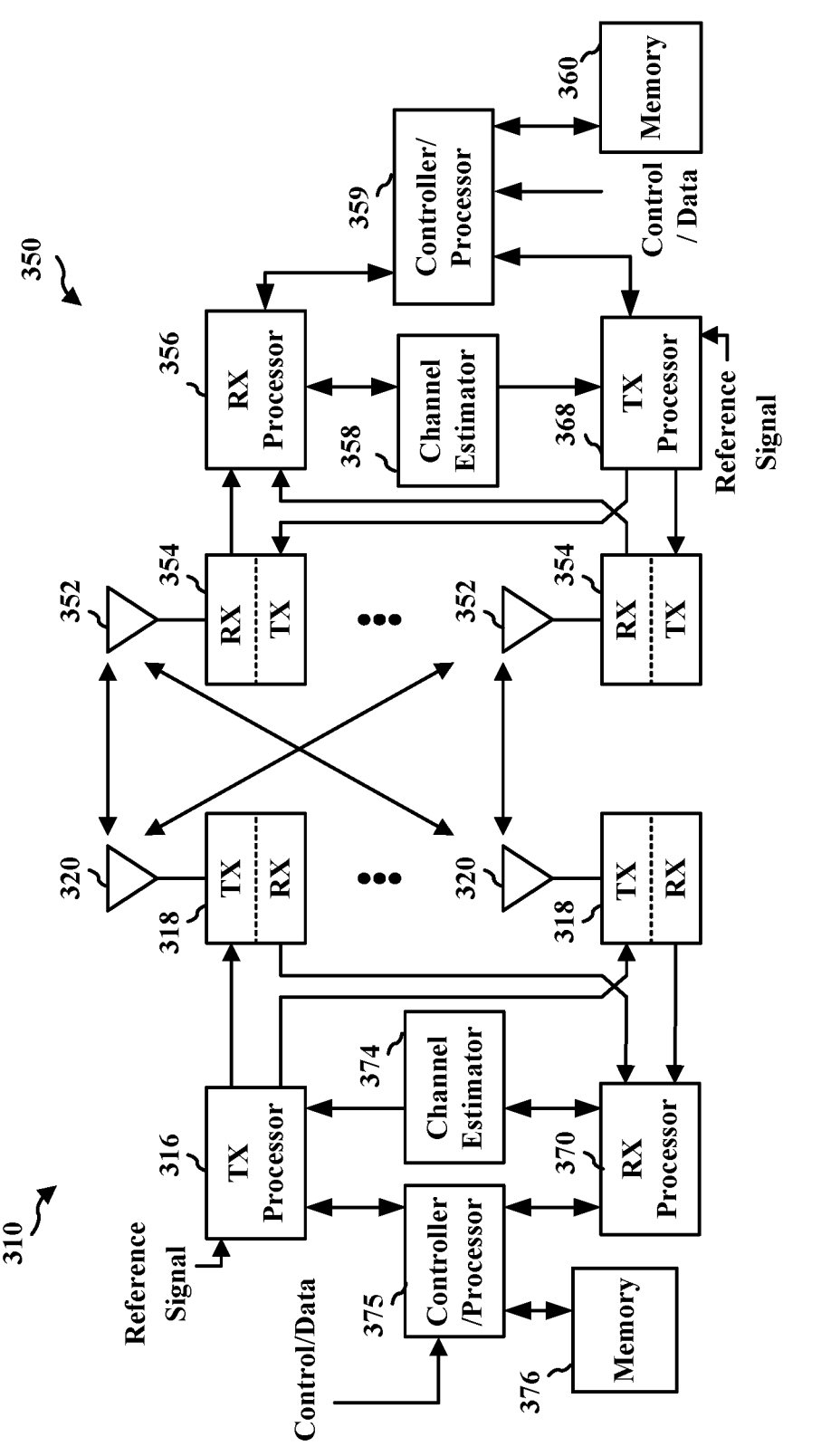
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

FIG. 4 is a block diagram 400 illustrating an example UE-to-network relay architecture. One or more remote UEs 402 may connect to the network 406 via a relay UE 404. The link between the remote UE 402 and the relay UE 404 may be referred to as a local link, and may be a PC5 link (i.e., a sidelink), or any other suitable link (e.g., a Bluetooth link, a Wi-Fi link, etc.) The relay UE 404 may be connected to the RAN 408 and thus the network 406 via a Uu link (i.e., a direct link). The remote UE 402 may be either in-coverage or out-of-coverage of the RAN 408. In case the remote UE 402 is within of the coverage area of the RAN 408, the relay connection via the relay UE 404 may still be suitable because the relay connection may provide a better signal quality than a direct Uu connection between the remote UE 402 and the RAN 408, and better throughput or reliability may be achieved with the use of the relayed link. The remote UE 402 may use either preconfigured provisioning information or information received from the network to perform relay selection/reselection or relay path setup. If the remote UE 402 is out-of-coverage of the RAN 408, the remote UE 402 may use preconfigured provisioning information to perform relay selection/reselection or relay path setup. If the remote UE 402 is within the coverage area of the RAN 408, the remote UE 402 may use the information provided by the RAN 408 to perform relay selection/reselection or relay path setup.

The relay connection between the remote UE 402 and the network 406 via the relay UE 404 may be either a Layer 3 (L3) relay connection or a Layer 2 (L2) relay connection. An L3 relay connection may be an IP relay connection, where the relay UE 404 may assign an IP address to the remote UE 402, and PDU sessions may be established over the IP relay. With an L2 relay connection, the remote UE 402 may establish a 5G NR connection with the base station/RAN 408 and the network 406 via the L2 relay connection.

Figures 5A, 5B:
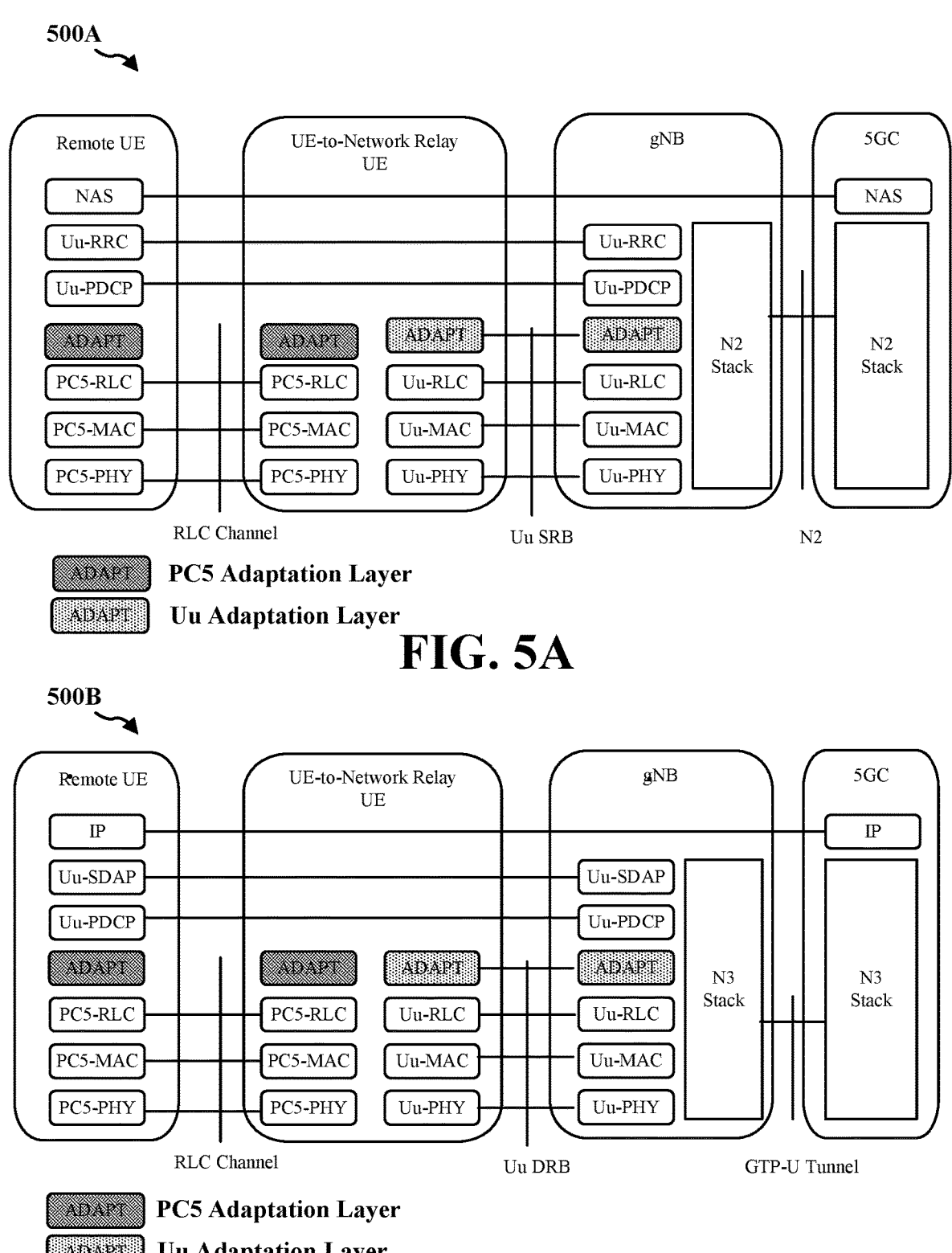
FIGS. 5A and 5B are block diagrams illustrating protocol stacks for an L2 UE-to-network relay.

FIGS. 5A and 5B are block diagrams 500A and 500B illustrating protocol stacks for an L2 UE-to-network relay. FIG. 5A illustrates a control plane protocol stack for an L2 UE-to-network relay. FIG. 5B illustrates a user plane protocol stack for an L2 UE-to-network relay. A Uu adaptation layer may be provided at the relay UE and at the base station. A PC5 adaptation layer may or may not be provided. The Uu adaptation layer may provide the functions of N:1 bearer mapping and data multiplexing for multiple remote UEs. At the relay UE, the Uu adaptation layer may provide the uplink bearer mapping between ingress PC5 RLC channels and egress Uu RLC channels. At the base station, the Uu adaptation layer may provide the downlink bearer mapping to map the Uu signaling radio bearer (SRB) or data radio bearer (DRB) of the remote UE into Uu RLC channels. The uplink or downlink adaptation layer header may include the Uu radio bearer information and identity information associated with the remote UE.

Figure 6:
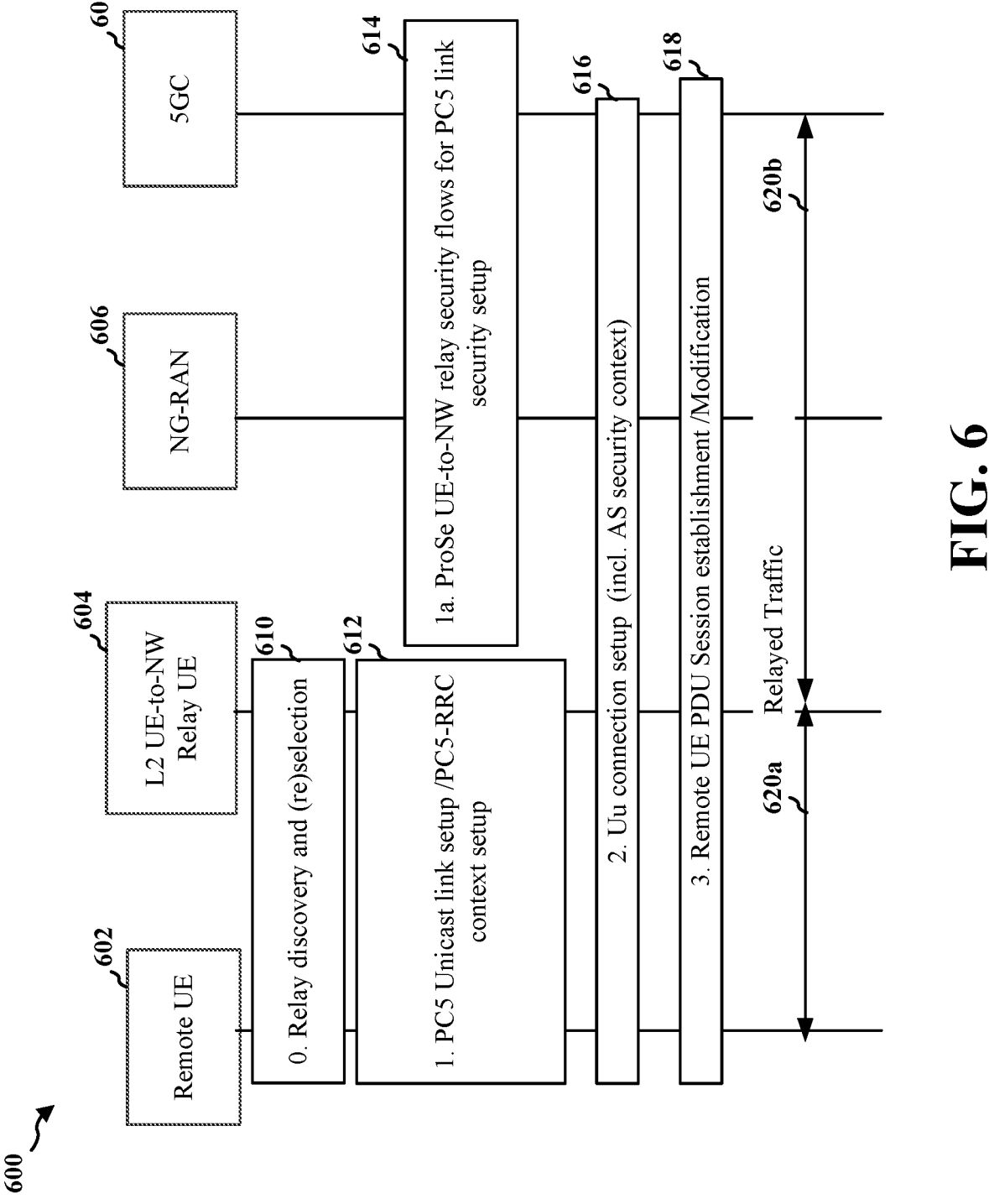
FIG. 6 is a communication flow of an L2 PC5 relay connection setup procedure.

FIG. 6 is a communication flow 600 of an L2 PC5 relay connection setup procedure. At 610, the remote UE 602 may perform relay discovery and (re)selection, and may discover and (re)select the relay UE 604. At 612, the remote UE 602 and the relay UE 604 may set up a PC5 unicast link or a PC5-RRC context. At 614, the relay UE 604, the base station 606, and the network 608 may perform a PC5 link security setup procedure. At 616, the remote UE 602 may set up a relayed Uu connection to the base station 606 and the network 608 via the relay UE 604. An access stratum (AS) security context may be set up. At 618, the remote UE 602 may establish or modify a UE PDU session with the network 608 via the relayed connection. The remote UE 602 may then communicate with the network 608 via the relayed connection. The relayed traffic 620 may include a first leg 620a transmitted between the remote UE 602 and the relay UE 604 and a second leg 620b transmitted between the relay UE 604 and the network 608.

At 612, the remote UE 602 may forward a connection establish RRC message (e.g., an RRCSetupRequest message or a RRCSetup message) using a default PC5 RLC/MAC configuration. This may apply for both in-coverage and out-of-coverage remote UEs 602. A relay UE 604 that is not in the RRC_CONNECTED state may perform its own connection establishment before forwarding the first RRC message from the remote UE 602. The base station 606 and the relay UE 604 may perform the relaying channel setup procedure for additional SRBs or DRBs over a Uu link. Based on the configuration from the base station 606, the relay UE 604 or the remote UE 602 may establish additional RLC channels for relaying SRBs or DRBs. Therefore, the remote UE 602 may establish PDU sessions with the network 608 to route user traffic via the relay UE 604 to the network 608.

Figure 7A:
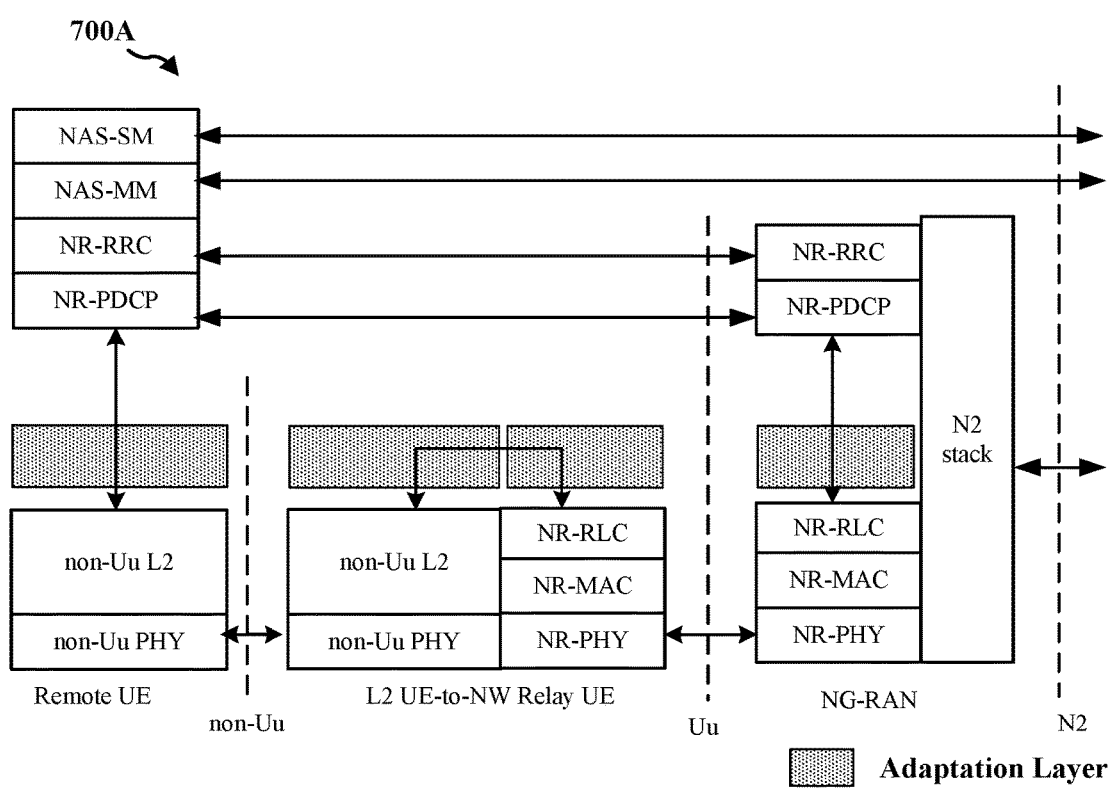
FIGS. 7A and 7B are block diagrams illustrating protocol stacks for an L2 non-3GPP RAT UE-to-network relay.
Figure 7B:
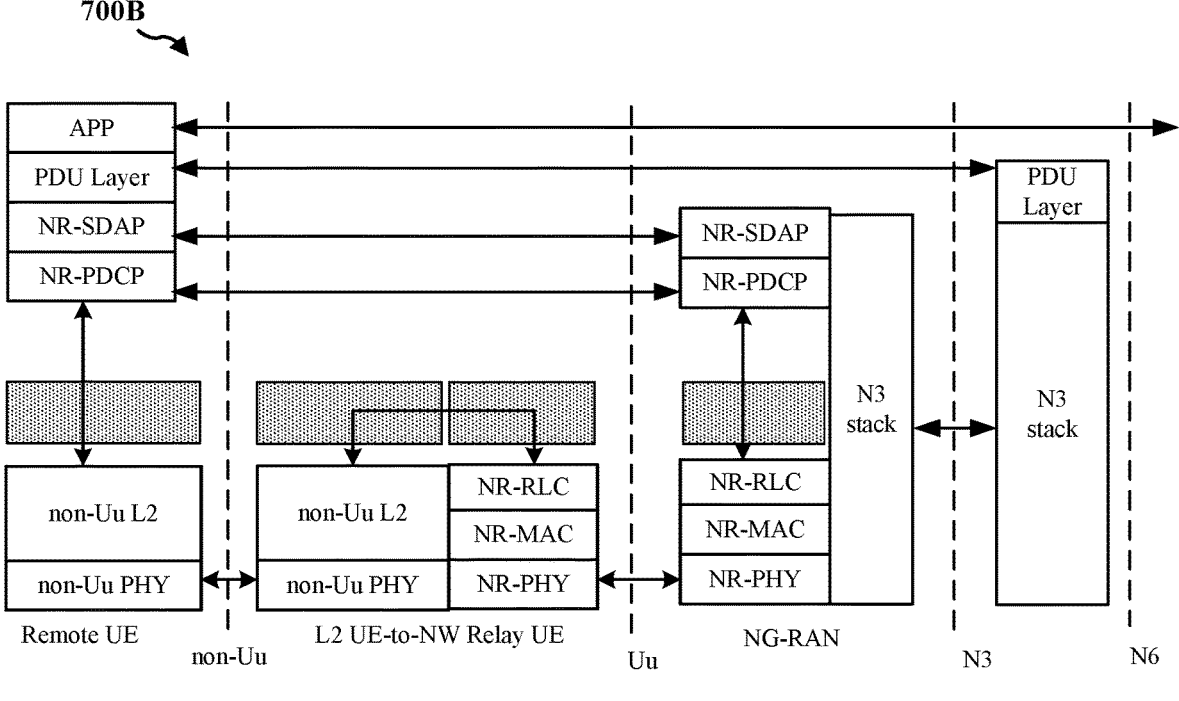

FIGS. 7A and 7B are block diagrams 700A and 700B illustrating protocol stacks for an L2 non-3GPP RAT UE-to-network relay. Examples of non-3GPP RATs may include Bluetooth, Wi-Fi, etc. FIG. 7A illustrates a control plane protocol stack for an L2 non-3GPP RAT UE-to-network relay. FIG. 7B illustrates a user plane protocol stack for an L2 non-3GPP RAT UE-to-network relay. An L2 relay may perform relaying operations at L2. Non-Uu links may be managed locally by the remote UE or the relay UE.

Figure 8:
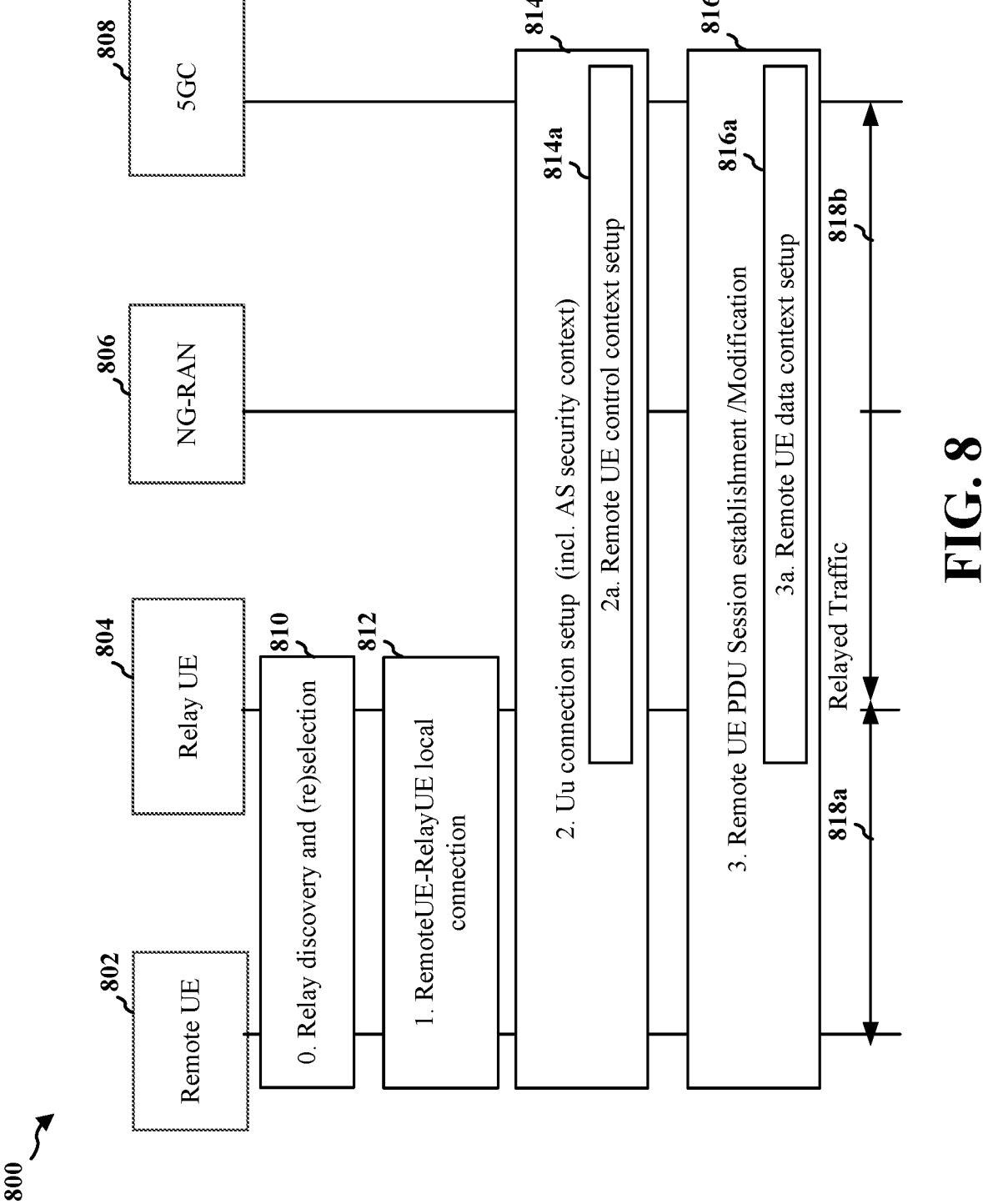
FIG. 8 is a communication flow of an L2 non-3GPP RAT relay connection setup procedure.

FIG. 8 is a communication flow 800 of an L2 non-3GPP RAT relay connection setup procedure. At 810, the remote UE 802 may perform relay discovery and (re)selection, and may discover and (re)select the relay UE 804. The relay discovery may be based on the specific discovery method associated with the non-3GPP RAT used. At 812, the remote UE 802 and the relay UE 804 may set up a local connection (e.g., a non-3GPP RAT connection such as a Bluetooth connection, a Wi-Fi connection, etc.). The local connection may be set up based on the procedures associated with the non-3GPP RAT used. At 814, the remote UE 802 may set up a relayed Uu connection to the base station 806 and the network 808 via the relay UE 804. An AS security context may be set up. At 814a, a remote UE control context may be set up. A NAS context may also be set up. At 816, the remote UE 802 may establish or modify a UE PDU session with the network 808 via the relayed connection. At 816a, a remote UE data context may be set up. The remote UE 802 may then communicate with the network 808 via the relayed connection. The relayed traffic 818 may include a first leg 818a transmitted between the remote UE 802 and the relay UE 804 and a second leg 818b transmitted between the relay UE 804 and the network 808. The base station 806 may configure the Uu SRBs or DRBs of the remote UE 802, which may include configuring the SRB or the DRB at the remote UE 802, and configuring the Uu RLC channels at the relay UE 804.

Figures 9A, 9B:
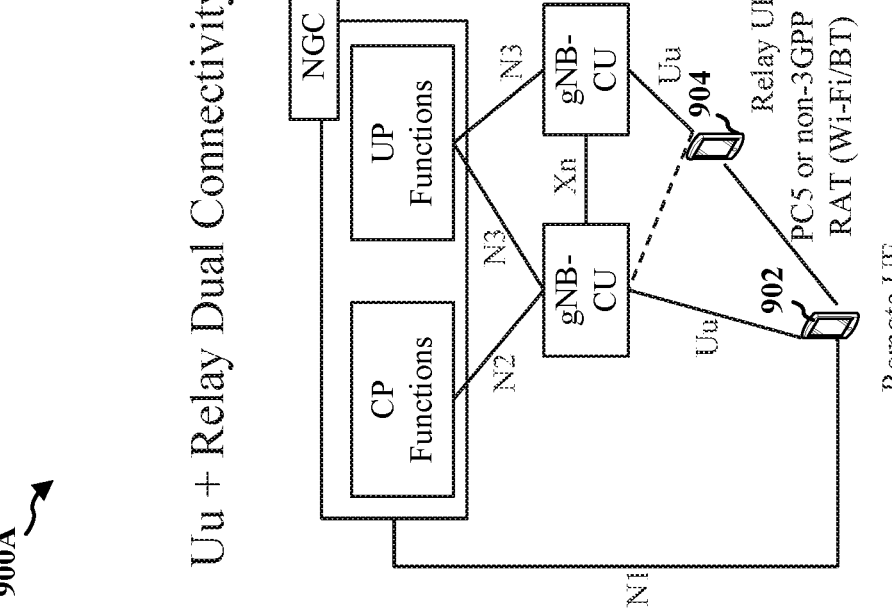
FIGS. 9A and 9B are block diagrams illustrating dual connectivity configurations including at least one UE-to-network relay connection.

FIGS. 9A and 9B are block diagrams 900A and 900B illustrating dual connectivity configurations including at least one UE-to-network relay connection. FIG. 9A illustrates a dual connectivity configuration at the remote UE 902 including one direct Uu link to the network and one relayed link to the network via a relay UE 904. The base station involved in the direct Uu link and the base station involved in the relayed link may be the same, or may be different. FIG. 9B illustrates a dual connectivity configuration at the remote UE 902 including a first relayed link to the network via a first relay UE 904a and a second relayed link to the network via a second relay UE 904b. The base station involved in the first relayed link and the base station involved in the second relayed link may be the same, or may be different. The local link between the remote UE 902 and a relay UE 904 may be a PC5 link (i.e., a sidelink), or may be a non-3GPP RAT link (e.g., a Wi-Fi link, a Bluetooth link, a Bluetooth Low Energy "LE" link, etc.). Irrespective of the RAT used, in a dual connectivity configuration, the first established connection may be the primary connection, and the base station associated with the first/primary connection may act as the master node (MN) or the master cell group (MCG). When the remote UE 902 is connected to two different base stations in a dual connectivity configuration, the base station associated with the first/primary connection may serve as the MN or MCG, and the base station associated with second/secondary connection may serve as the secondary node (SN) or the secondary cell group (SCG). When the remote UE 902 is connected to the same base station via two separate links in a dual connectivity configuration, the same base station may act as both an MN and an SN.

Figure 10:
FIG. 10 is a block diagram illustrating user plane bearer models from the perspective of the remote UE.

FIG. 10 is a block diagram 1000 illustrating user plane bearer models from the perspective of the remote UE. From the perspective of the remote UE, the MCG bearer type, the SCG bearer type, and the split bearer type may be supported. From the perspective of the remote UE, the bearers may use the L2 UE-to-network relay user plane protocol stack to communicate with the network. If a PC5 link is used for the local link between the remote UE and the relay UE, the bearers may use the Uu PDCP layer and the PC5 RLC/MAC/PHY layers to communicate with the relay UE connected over the PC5 link. If a non-3GPP RAT (e.g., Wi-Fi, Bluetooth, Bluetooth LE, etc.) is used for the local link between the remote UE and the relay UE, the bearers may use the Uu PDCP layer and the L2/Layer 1 (L1) of the non-3GPP RAT to communicate with the relay UE.

Figure 11:
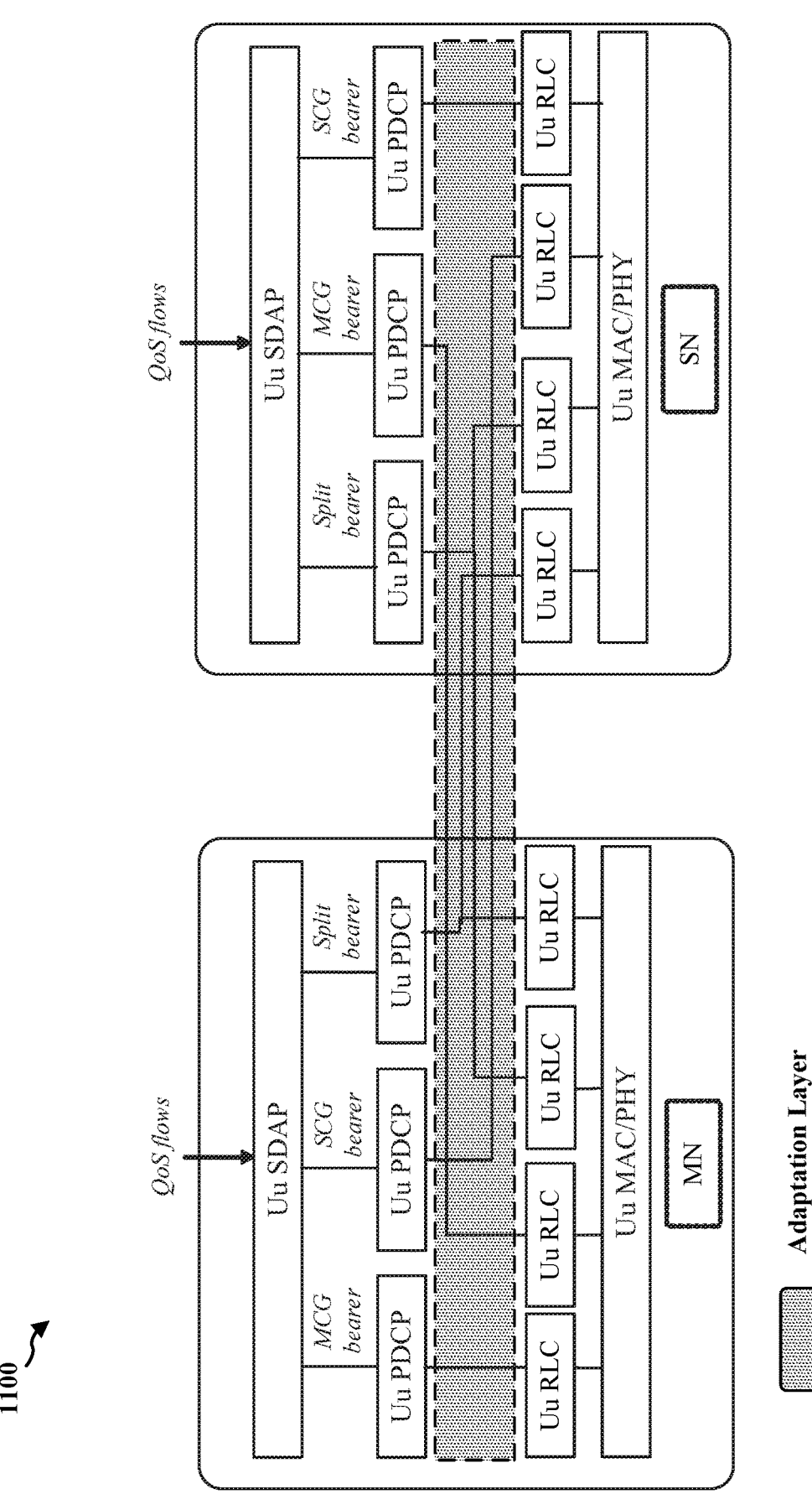
FIG. 11 is a block diagram illustrating user plane bearer models from the perspective of the network.

FIG. 11 is a block diagram 1100 illustrating user plane bearer models from the perspective of the network. This may be the same as the NR-dual connectivity (DC) (NR-DC) network side protocol stack. Both MN and SN terminated bearers may be supported for the MCG bearer type, the SCG bearer type, and the split bearer type.

Figure 12:
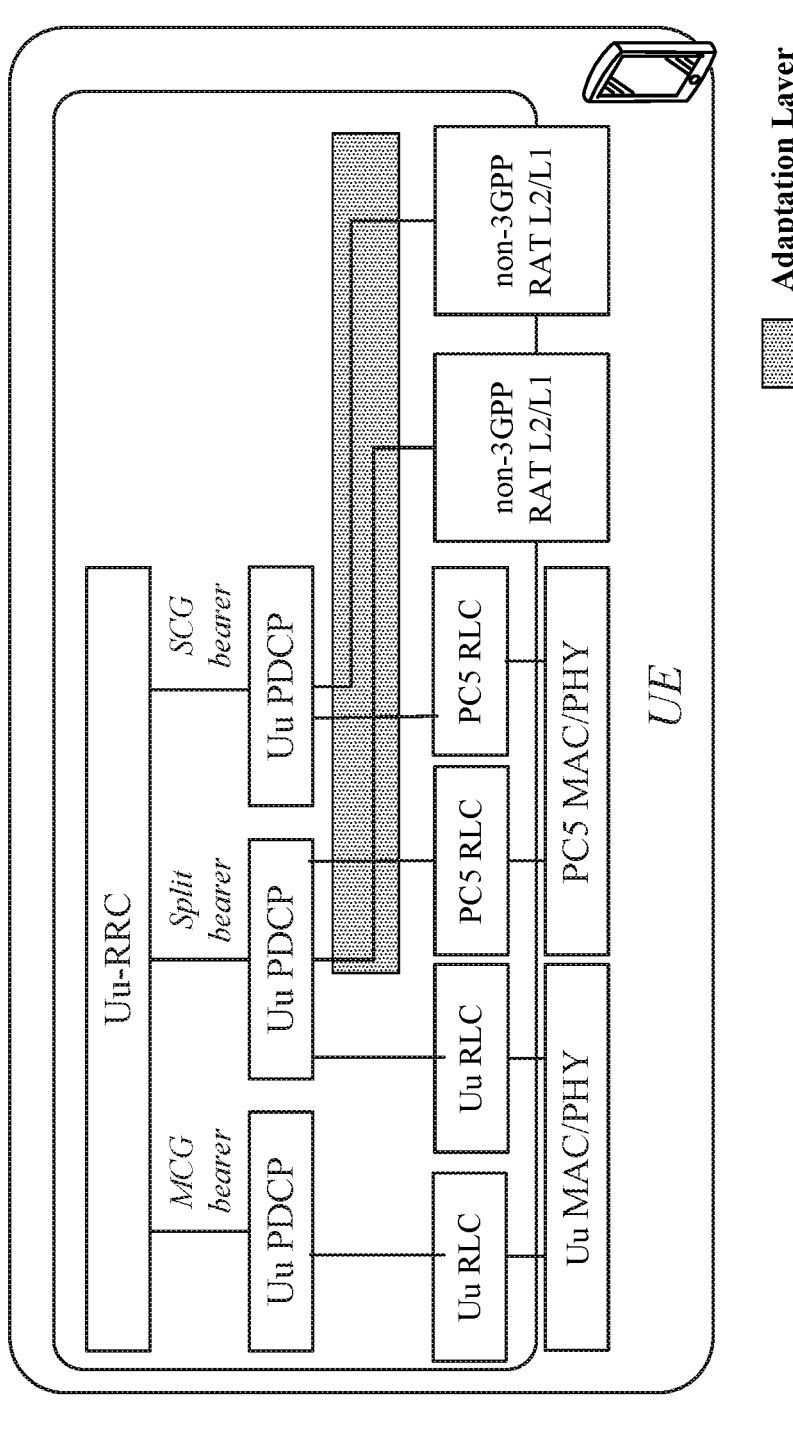
FIG. 12 is a block diagram illustrating control plane bearer models from the perspective of the remote UE.

FIG. 12 is a block diagram 1200 illustrating control plane bearer models from the perspective of the remote UE. The remote UE may be associated with a single Uu RRC state based on the RRC state associated with the MN. MCG, SCG, and split bearer types for Uu SRBs may be supported. In particular, SRB 0/1/2 via an MCG bearer, SRB 1/2/3 via an SCG bearer, and split SRB 1/2 via a split bearer may be supported. The remote UE may support PC5 SRBs on the PC5 link with the relay UE. Accordingly, a PC5 unicast link may be set up for relaying the traffic. PC5 SRBs may be configured based on the sidelink configuration. The remote UE may also support non-3GPP RAT control plane signaling to support the connection with the relay UE via the non-3GPP RAT.

Figure 13:
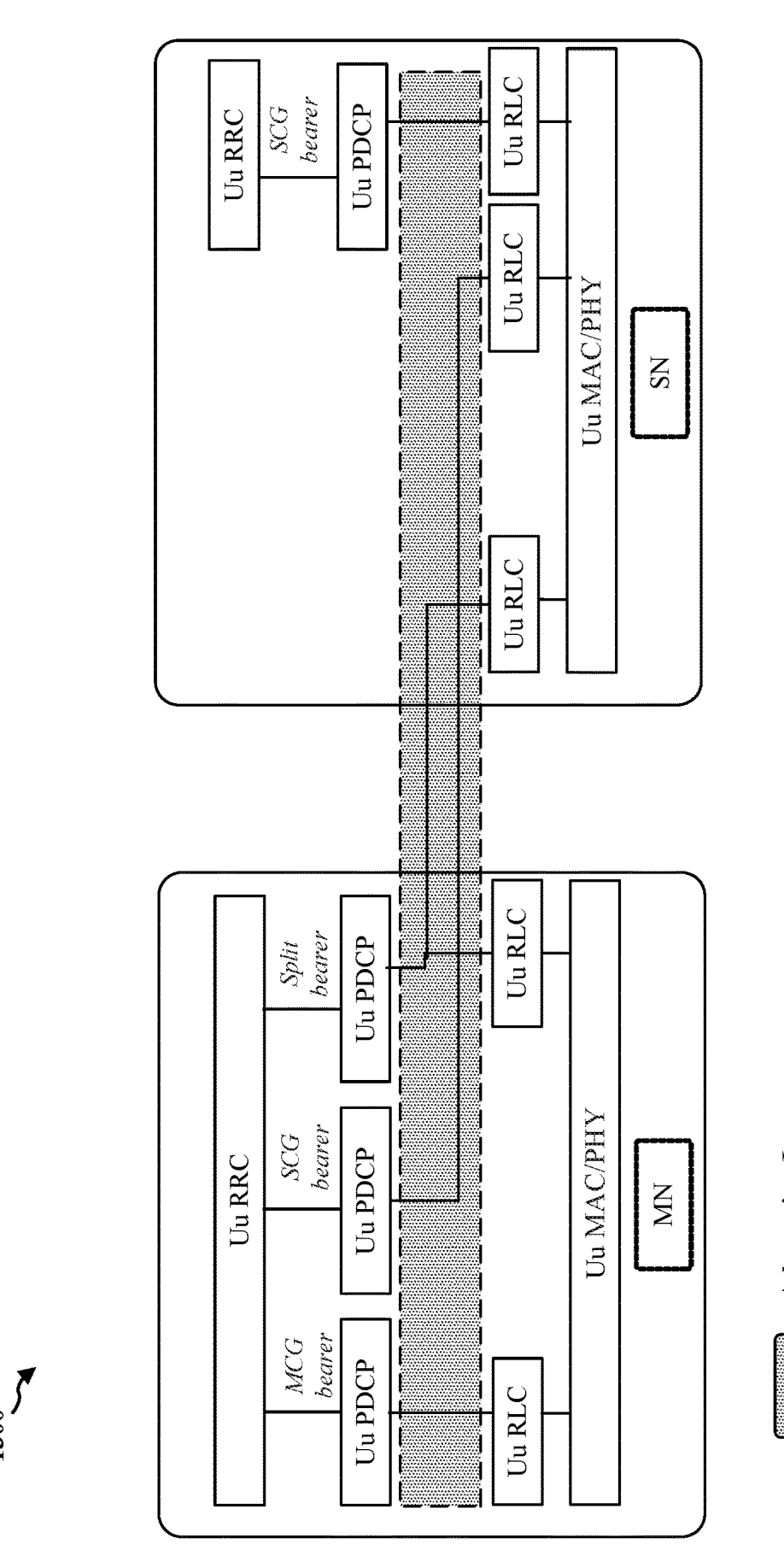
FIG. 13 is a block diagram illustrating control plane bearer models from the perspective of the network.

FIG. 13 is a block diagram 1300 illustrating control plane bearer models from the perspective of the network. This may be the same as the NR-DC network side protocol stack. MCG, SCG, and split bearer types for Uu SRBs may be supported. In particular, SRB 0/1/2 via an MCG bearer, SRB 1/2/3 via an SCG bearer, and split SRB 1/2 via a split bearer may be supported.

In one aspect, a list of suitable SNs may be used to assist with the selection of the suitable relay UE and the suitable cell for SN addition. A base station or a cell may be suitable as an SN because, for example, it has an Xn connection with the MN. Further, some relay UEs may not be supported by the MN. The remote UE may be configured with the list of suitable SNs. In one configuration, the list of suitable SNs may be preconfigured at the remote UE. In one configuration, the MN may provide the configuration of the list of suitable SNs via one or more SIBs or a (dedicated) RRC message. Based on the list of suitable SNs, the remote UE may discover and connect to the relay UEs that support a connection to at least one of the suitable SNs. This may be performed in addition to the conventional relay service code (type) based discovery.

In one configuration, the list of suitable SNs may include cell identities of the cells that are suitable to be SNs. A relay UE may broadcast the identity of its relay UE serving cell. Thus, based on the list, the remote UE may discover any relay UE that is under one of these suitable cells (i.e., has a connection to at least one of these suitable cells). In another configuration, the list of suitable SNs may include cell identities of the cells that are suitable to be SNs as well as identities of suitable relay UEs. An identity of a suitable relay UE may be a roadside unit (RSU) identity, a smartphone identity, or any other relay UE identity. Thus, based on the list, the remote UE may discover relay UEs whose identities are among the identities of suitable relay UEs and that have a connection to at least one of the suitable cells.

Figure 14:
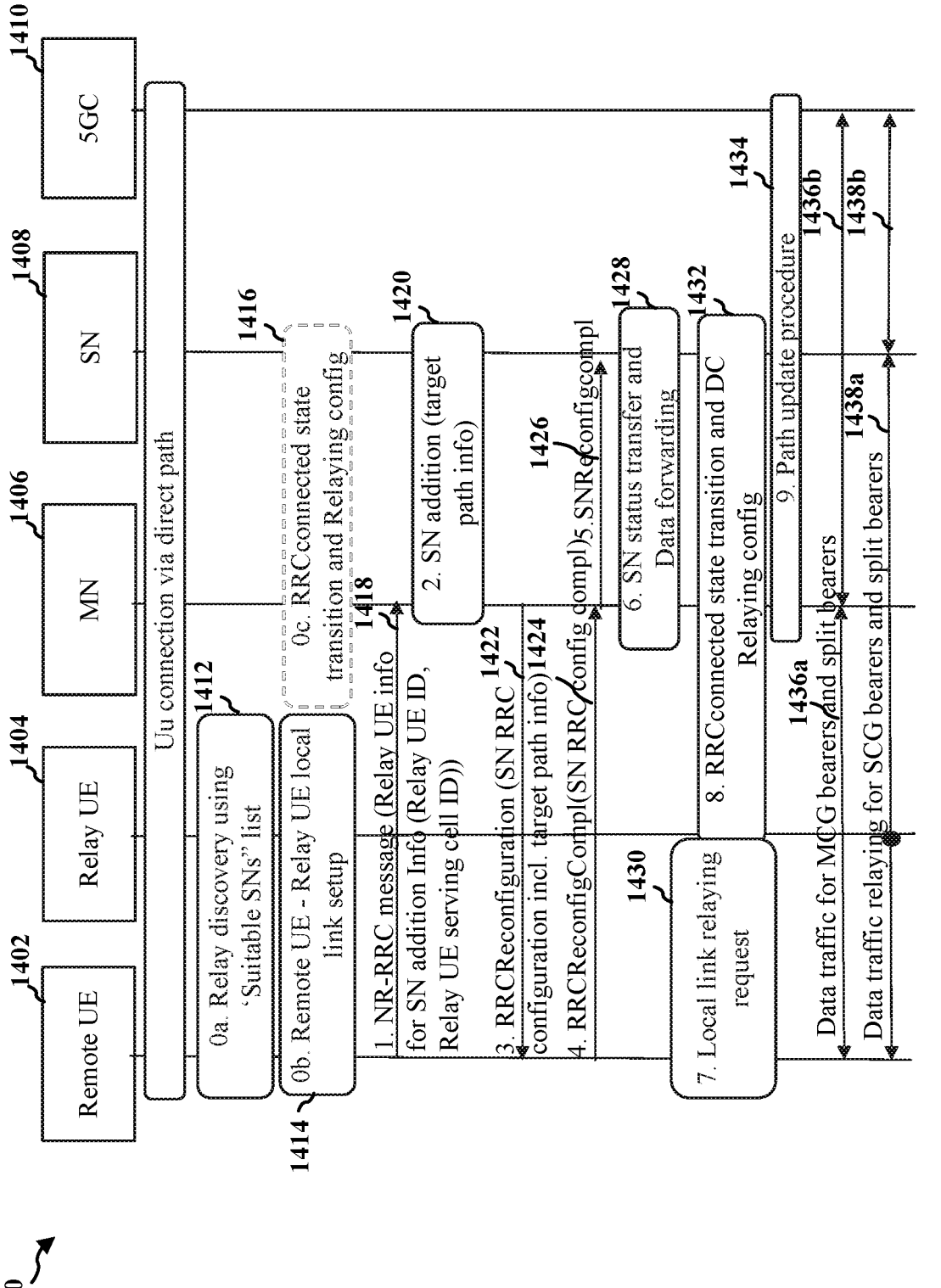
FIG. 14 is a communication flow of an SN addition procedure controlled at the remote UE.

FIG. 14 is a communication flow 1400 of an SN addition procedure controlled at the remote UE. An SN addition procedure may refer to a procedure of establishing a new secondary link with an SN. The primary connection between the remote UE 1402 and the MN 1406 may be a direct Uu link. In some configurations, the primary connection between the UE 1402 and the MN 1406 may also be a relayed link via another relay UE (not shown). At 1412, the remote UE 1402 may perform relay discovery using a list of suitable SNs. A relay UE 1402 may be discovered. At 1414, the remote UE 1402 may set up a local link with the relay UE 1404. In one configuration, at 1416, if the relay UE 1404 is not already in the RRC_CONNECTED state (the relay UE 1404 may be in either the RRC_IDLE/RRC_INACTIVE state or the RRC_CONNECTED state before the SN addition procedure), the relay UE 1404 may transition to the RRC_CONNECTED state. The SN 1408 may transmit the relaying configuration to the relay UE 1404 in an RRC Reconfiguration message. At 1418, the remote UE 1402 may inform the MN 1406 about the local connection that is available using an RRC message. The RRC message may be a SidelinkUEInformationNR message (in case the local link is a PC5 link) or a non-3GPPconnectionInformation message (in case the local link is a non-3GPP RAT link).

In particular, the remote UE 1402 may transmit the relay UE information associated with the SN addition procedure to the MN 1406 in the RRC message. The relay UE information associated with the SN addition procedure may include an identity of the relay UE 1404 and an identity of the relay UE serving cell (i.e., the identity of the SN 1408). The MN 1406 may decide whether to add the cell corresponding to the relay UE 1404 (i.e., the relay UE serving cell) for an SN connection for the remote UE 1402. At 1420, the MN 1406 may perform an SN addition operation with the SN 1408. In particular, the MN 1406 may transmit the target path information to the SN 1408. At 1422, the MN 1406 may transmit to the remote UE 1402 an SN 1408 configuration (e.g., SN RRC configuration) including the target path information in an RRC message. In particular, the RRC message may be an RRC Reconfiguration message. The remote UE 1402 may thus learn the relay path to use for the SN addition operation. At 1424, the remote UE 1402 may transmit to the MN 1406 an indication of SN configuration completion (e.g., SN RRC configuration complete) in an RRC message. The RRC message may be an RRC Reconfiguration Complete message. At 1426, the MN 1406 may transmit to the SN 1408 an indication of SN reconfiguration completion. At 1428, the MN 1406 and the SN 1408 may perform SN status transfer and data forwarding operations. At 1430, the remote UE 1402 may transmit a request to relay data over the local link the relay UE 1404. In case the local link is previously existing, the remote UE 1402 may modify the local link to activate the L2 relaying. In one configuration, if the relay UE 1404 is not in or transitioned to the RRC_CONNECTED state at 1416, at 1432, the relay UE 1404 may transition into the RRC_CONNECTED state. Further, the SN 1408 may transmit the dual connectivity relaying configuration to the relay UE 1404 in an RRC Reconfiguration message. The relay UE 1404, the MN 1406, and the SN 1408 may exchange dual connectivity relaying configuration information. At 1434, the MN 1406, the SN 1408, and the network 1410 may perform a path update procedure. MCG bearers or split bearers may be configured between the remote UE 1402 and the network 1410 via the MN 1406 to carry data traffic 1436. The data traffic 1436 may include a first leg 1436a transmitted between the remote UE 1402 and the MN 1406 and a second leg 1436b transmitted between the MN 1406 and the network 1410. SCG bearers or split bearers may be configured between the remote UE 1402 and the network 1410 via the relay UE 1404 and the SN 1408 to carry data traffic 1438. In particular, the MN 1406 may transmit the relaying configuration for SCG bearers or split bearers to the relay UE 1404. The data traffic 1438 may include a first leg transmitted 1438a between the remote UE 1402 and the SN 1408 via the relay UE 1404 and a second leg 1438b transmitted between the SN 1408 and the network 1410.

Therefore, the relay UE 1404 may transition to the RRC_CONNECTED state: (1) on setting up a local link with the remote UE 1402 for the relaying connection (1416), (2) on receiving a request from the remote UE 1402 on the already established local link for starting the relaying connection after the SN addition operation (1430, 1432), or (3) when the SN 1408 pages the relay UE 1404 and transitions the relay UE 1404 to the RRC_CONNECTED state (1432). It may be beneficial to defer the transition of the relay UE 1404 to the RRC_CONNECTED state until 1430 or 1432 because a transition at 1416 may be an unnecessary and wasted transition if the relaying setup is subsequently not successful.

Figure 15:
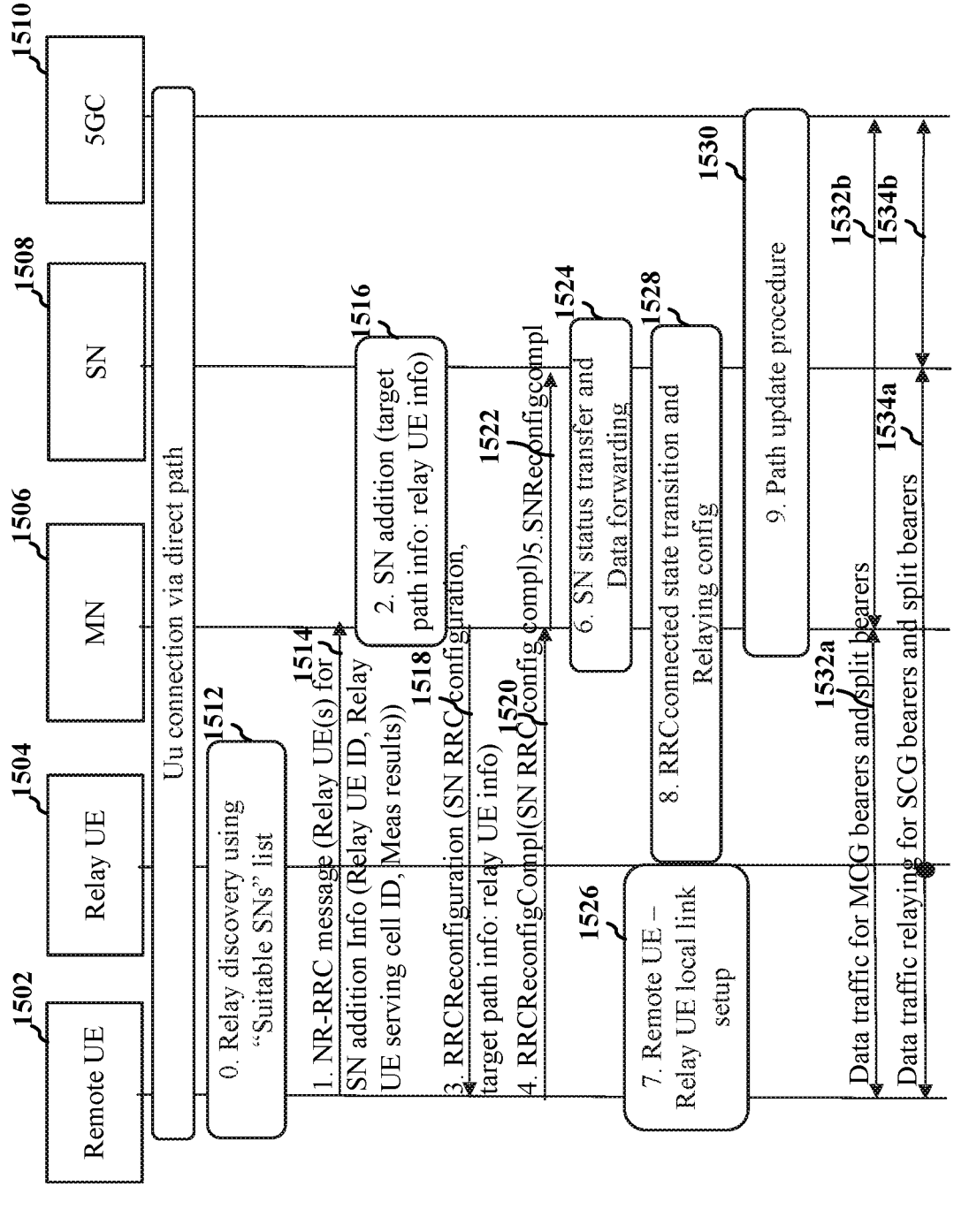
FIG. 15 is a communication flow of an SN addition procedure controlled at the MN.

FIG. 15 is a communication flow 1500 of an SN addition procedure controlled at the MN. The primary connection between the remote UE 1502 and the MN 1506 may be a direct Uu link. In some configurations, the primary connection between the UE 1502 and the MN 1506 may also be a relayed link via another relay UE (not shown). At 1512, the remote UE 1502 may perform relay discovery using a list of suitable SNs. The MN 1506 may configure the remote UE 1502 to perform measurements of relay UEs. At 1514, the remote UE 1502 may report the discovered relay UEs to the MN 1506 in an RRC message over the direct Uu connection for the SN addition procedure. The RRC message may be a measurement report, a SidelinkUEInformationNR message (in case a discovered relay UE is connectable over a PC5 link) or a non-3GPPconnectionInformation message (in case a discovered relay UE is connectable over a non-3GPP RAT link). In particular, the remote UE 1502 may transmit the relay UE information associated with the SN addition procedure to the MN 1506 in the RRC message. The relay UE information associated with the SN addition procedure may include identities of the relay UEs, identities of the relay UE serving cells, and/or measurement results for the PC5 links or the non-3GPP RAT links. The MN 1506 may select a suitable relay UE 1504 from the discovered relay UEs. The SN 1508 may be the serving cell of the suitable relay UE 1504. At 1516, the MN 1506 may prepare the SN 1508 for the SN addition operation. In particular, the MN 1506 may transmit the target path information and the relay UE 1504 information to the SN 1508. At 1518, the MN 1506 may transmit to the remote UE 1502 an SN 1508 configuration (e.g., SN RRC configuration) including the target path information and the relay UE 1504 information (e.g., the identity of the relay UE 1504) in an RRC message. In particular, the RRC message may be an RRC Reconfiguration message. The remote UE 1502 may thus learn the relay path to use for the SN addition operation. At 1520, the remote UE 1502 may transmit to the MN 1506 an indication of SN configuration completion (e.g., SN RRC configuration complete) in an RRC message. The RRC message may be an RRC Reconfiguration Complete message. At 1522, the MN 1506 may transmit to the SN 1508 an indication of SN reconfiguration completion. At 1524, the MN 1506 and the SN 1508 may perform SN status transfer and data forwarding operations. At 1526, the remote UE 1502 and the relay UE 1504 may set up a local link based on local procedures. The remote UE 1502 may indicate to the relay UE 1504 that the local link is set up for the L2 relaying. In one configuration, if the relay UE 1504 is not in the RRC_CONNECTED state, at 1528, the relay UE 1504 may transition into the RRC_CONNECTED state. Further, the SN 1508 may transmit the dual connectivity relaying configuration to the relay UE 1504 in an RRC Reconfiguration message. The relaying configuration may include the Uu logical channel configuration. The relay UE 1504, the MN 1506, and the SN 1508 may exchange dual connectivity relaying configuration information. At 1530, the MN 1506, the SN 1508, and the network 1510 may perform a path update procedure. MCG bearers or split bearers may be configured between the remote UE 1502 and the network 1510 via the MN 1506 to carry data traffic 1532. The data traffic 1532 may include a first leg 1532a transmitted between the remote UE 1502 and the MN 1506 and a second leg transmitted 1532b between the MN 1506 and the network 1510. SCG bearers or split bearers may be configured between the remote UE 1502 and the network 1510 via the relay UE 1504 and the SN 1508 to carry data traffic 1534. In particular, the MN 1506 may transmit the relaying configuration for SCG bearers or split bearers to the relay UE 1504. The data traffic 1534 may include a first leg 1534a transmitted between the remote UE 1502 and the SN 1508 via the relay UE 1504 and a second leg 1534b transmitted between the SN 1508 and the network 1510.

Figure 16:
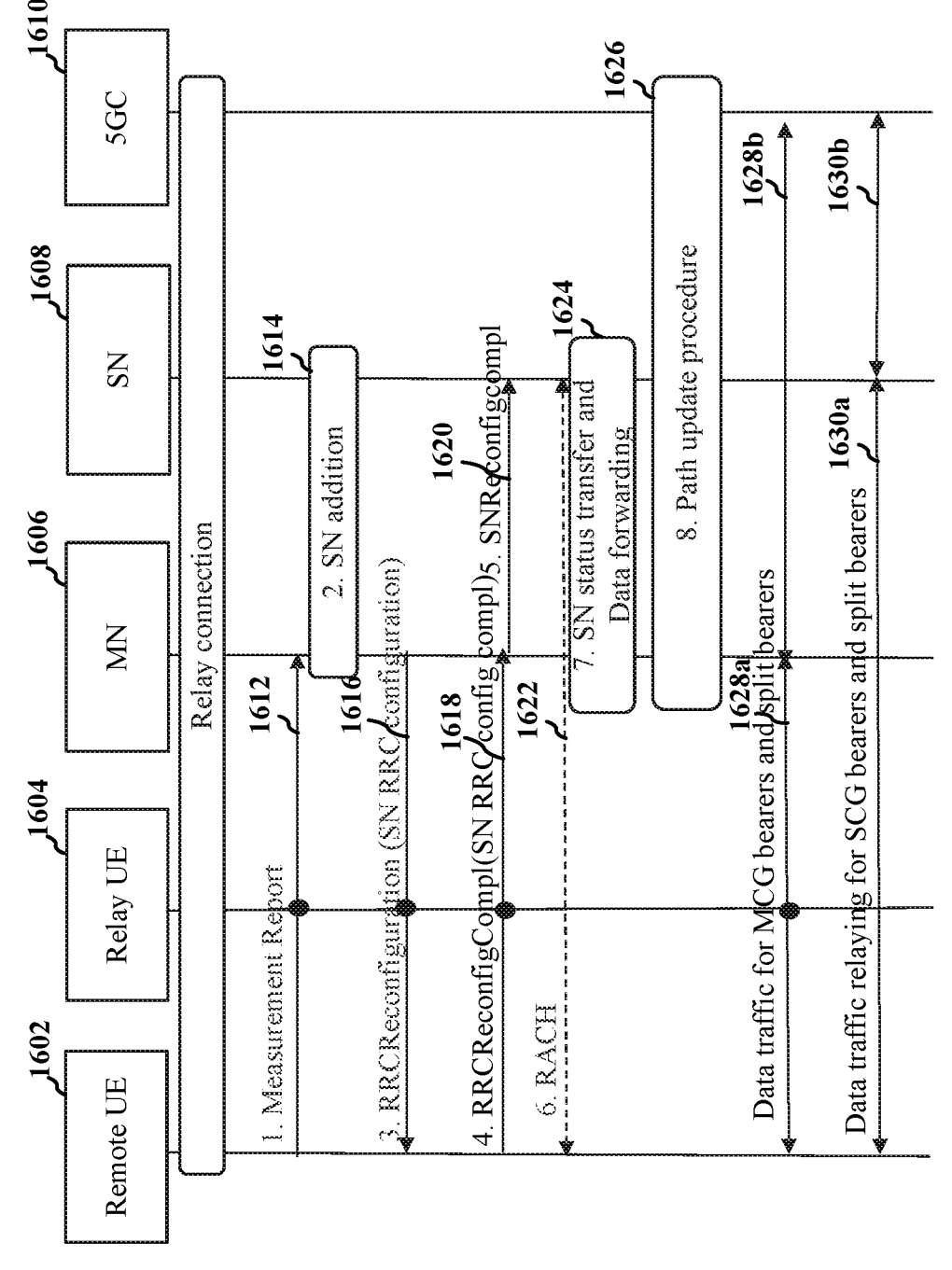
FIG. 16 is a communication flow of an SN addition procedure controlled at the MN.

FIG. 16 is a communication flow 1600 of an SN addition procedure controlled at the MN. The primary connection between the remote UE 1602 and the MN 1606 may be a relayed link via the relay UE 1604. A similar procedure as the SN addition procedure in NR-DC may be performed. At 1612, the remote UE 1602 may transmit a measurement report of the discovered SNs to the MN 1606. The MN 1606 may select an SN 1608 from the discovered SNs. At 1614, the MN 1606 may perform an SN addition operation with the SN 1608. At 1616, the MN 1606 may transmit an SN configuration (e.g., an SN RRC configuration) to the remote UE 1602 in an RRC message. The RRC message may be an RRC Reconfiguration message transmitted over the primary relayed link via the relay UE 1604. At 1618, the remote UE 1602 may transmit to the MN 1606 an indication of SN configuration completion (e.g., SN RRC configuration complete) in an RRC message. The RRC message may be an RRC reconfiguration complete message transmitted over the primary relayed link via the relay UE 1604. At 1620, the MN 1606 may transmit to the SN 1608 an indication of SN reconfiguration completion. At 1622, the remote UE 1602 may perform a random access channel (RACH) procedure to establish a direct Uu connection with the SN 1608. At 1624, the MN 1606 and the SN 1608 may perform SN status transfer and data forwarding operations. At 1626, the MN 1606, the SN 1608, and the network 1610 may perform a path update procedure. MCG bearers or split bearers may be configured between the remote UE 1502 and the network 1510 via the relay UE 1604 and the MN 1606 to carry data traffic 1628. The data traffic 1628 may include a first leg 1628a transmitted between the remote UE 1602 and the MN 1606 via the relay UE 1604 and a second leg 1628b transmitted between the MN 1606 and the network 1610. SCG bearers or split bearers may be configured between the remote UE 1602 and the network 1610 via the SN 1608 to carry data traffic 1630. The data traffic 1630 may include a first leg 1630a transmitted between the remote UE 1602 and the SN 1608 and a second leg 1630b transmitted between the SN 1608 and the network 1610.

In one aspect, DRB modeling in NR-DC may be used. The MN may manage the bearer type for the relaying bearers. All bearer type change options may be supported. These may include a change of an MCG bearer to or from a split bearer, a change of an MCG bearer to or from an SCG bearer, or a change of an SCG bearer to or from a split bearer. The change of the bearer termination point may be supported for all bearer types. Similar to the scenarios in NR-DC, unidirectional traffic (e.g., uplink traffic via the relay path and the downlink traffic via the Uu path) may be controlled by QoS flows or bearer configuration. The uplink traffic QoS flows may be configured for the relay path bearers.

FIG. 17 is a diagram 1700 illustrating duplication associated with dual connectivity. Duplication may be performed at the PDCP layer. Per each bearer (e.g., an SRB or a DRB), with dual connectivity and PDCP duplication, a same PDCP PDU may be submitted and transmitted twice on the two different RLC entities (e.g., a PC5 RLC bearer and a Uu RLC bearer). An SRB may be configured with RRC signaling. A DRB may be configured with RRC signaling in case of a PC5 link as well as in case of a non-3GPP RAT link. In case of a PC5 local link, a DRB may also be configured with a MAC-control element (CE) (MAC-CE).

In one aspect, duplication over a PC5 link may be performed via a MAC-CE for a DRB. A sidelink MAC-CE may include a number of fields $D_i$, where i=1 to n. A field $D_i$ may indicate the activation or deactivation status of the PDCP duplication of the DRB i, where i is in the ascending order of the identifiers of the DRBs configured with PDCP duplication and with RLC entity(ies) associated with this MAC entity.

FIG. 18 is a flowchart 1800 of a method of wireless communication. The method may be performed by a remote UE (e.g., the UE 104/350; the remote UE 1402/1502; the apparatus 2202). At 1802, the remote UE may detect one or more relay UEs for a dual connectivity configuration for communication with a first network entity and a second network entity. The dual connectivity configuration may include a primary connection with the first network entity and a secondary connection with the second network entity. For example, 1802 may be performed by the dual connectivity component 2240 in FIG. 22. Referring to FIGS. 14 and 15, at 1412/1512, the remote UE 1402/1502 may detect one or more relay UEs 1404/1504 for a dual connectivity configuration for communication with a first network entity 1406/1506 and a second network entity 1408/1508.

At 1804, the remote UE may receive, from the first network entity, a configuration for establishing the secondary connection via one of the one or more relay UEs. For example, 1804 may be performed by the dual connectivity component 2240 in FIG. 22. Referring to FIGS. 14 and 15, at 1422/1518, the remote UE 1402/1502 may receive, from the first network entity 1406/1506, a configuration for establishing the secondary connection via one of the one or more relay UEs 1404/1504.

At 1806, the remote UE may establish the secondary connection via the one of the one or more relay UEs for communication with the second network entity. For example, 1806 may be performed by the dual connectivity component 2240 in FIG. 22. Referring to FIGS. 14 and 15, at 1430/1526, the remote UE 1402/1502 may establish the secondary connection via the one of the one or more relay UEs 1404/1504 for communication with the second network entity 1408/1508.

At 1808, the remote UE may configure one or more second bearers for the secondary connection via the one of the one or more relay UEs. The one or more second bearers supporting data transmission via the secondary connection. For example, 1808 may be performed by the dual connectivity component 2240 in FIG. 22.

FIG. 19 is a flowchart 1900 of a method of wireless communication. The method may be performed by a remote UE (e.g., the UE 104/350; the remote UE 1402/1502; the apparatus 2202). At 1904, the remote UE may detect one or more relay UEs for a dual connectivity configuration for communication with a first network entity and a second network entity. The dual connectivity configuration may include a primary connection with the first network entity and a secondary connection with the second network entity. For example, 1904 may be performed by the dual connectivity component 2240 in FIG. 22. Referring to FIGS. 14 and 15, at 1412/1512, the remote UE 1402/1502 may detect one or more relay UEs 1404/1504 for a dual connectivity configuration for communication with a first network entity 1406/1506 and a second network entity 1408/1508.

At 1908, the remote UE may receive, from the first network entity, a configuration for establishing the secondary connection via one of the one or more relay UEs. For example, 1908 may be performed by the dual connectivity component 2240 in FIG. 22. Referring to FIGS. 14 and 15, at 1422/1518, the remote UE 1402/1502 may receive, from the first network entity 1406/1506, a configuration for establishing the secondary connection via one of the one or more relay UEs 1404/1504.

At 1910, the remote UE may establish the secondary connection via the one of the one or more relay UEs for communication with the second network entity. For example, 1910 may be performed by the dual connectivity component 2240 in FIG. 22. Referring to FIGS. 14 and 15, at 1430/1526, the remote UE 1402/1502 may establish the secondary connection via the one of the one or more relay UEs 1404/1504 for communication with the second network entity 1408/1508.

At 1912, the remote UE may configure one or more second bearers for the secondary connection via the one of the one or more relay UEs. The one or more second bearers supporting data transmission via the secondary connection. For example, 1912 may be performed by the dual connectivity component 2240 in FIG. 22.

In one configuration, the primary connection with the first network entity may include a direct connection or a relayed connection.

In one configuration, the detection of the one or more relay UEs may be based on a list of network entities suitable for the secondary connection.

In one configuration, the list of network entities suitable for the secondary connection may be preconfigured, or may be received from the first network entity in a SIB or an RRC message.

In one configuration, at 1902, the remote UE may receive, from the first network entity, an indication of the dual connectivity configuration. For example, 1902 may be performed by the dual connectivity component 2240 in FIG. 22.

In one configuration, at 1906, the remote UE may transmit, to the first network entity, an indication of the detected one or more relay UEs. For example, 1906 may be performed by the dual connectivity component 2240 in FIG. 22. Referring to FIGS. 14 and 15, at 1418/1514, the remote UE 1402/1502 may transmit, to the first network entity 1406/1506, an indication of the detected one or more relay UEs 1404/1504.

In one configuration, the indication of the detected one or more relay UEs may be transmitted to the first network entity in an RRC message.

In one configuration, the configuration for establishing the secondary connection may be received from the first network entity in an RRC message.

In one configuration, the first network entity may be a master node and the second network entity may be a secondary node.

In one configuration, the secondary connection may include a new local link or a previously existing local link with the one of the one or more relay UEs.

In one configuration, if the secondary connection includes the previously existing link, the remote UE may configure the previously existing link to support a relaying capability.

In one configuration, the new local link or the previously existing local link may include one of a sidelink, a peer-to-peer communication link, a device-to-device communication link, a Bluetooth link, or a Wi-Fi link.

In one configuration, at 1914, the remote UE may communicate with the first network entity via one or more first bearers for the primary connection. For example, 1914 may be performed by the dual connectivity component 2240 in FIG. 22. Referring to FIGS. 14 and 15, at 1436a/1532a, the remote UE 1402/1502 may communicate with the first network entity 1406/1506 via one or more first bearers for the primary connection. At 1916, the remote UE may communicate with the second network entity via the one or more second bearers for the secondary connection. For example, 1916 may be performed by the dual connectivity component 2240 in FIG. 22. Referring to FIGS. 14 and 15, at 1438a/1534a, the remote UE 1402/1502 may communicate with the second network entity 1408/1508 via the one or more second bearers for the secondary connection.

In one configuration, at 1918, the remote UE may transmit a same PDU via one of the one or more first bearers for the primary connection and via one of the one or more second bearers for the secondary connection. For example, 1918 may be performed by the dual connectivity component 2240 in FIG. 22.

FIG. 20 is a flowchart 2000 of a method of wireless communication. The method may be performed by a base station/master node/first network entity (e.g., the base station 102/180/310; the master node 1406/1506; the apparatus 2302). At 2002, the first network entity may receive, from a remote UE, an indication of one or more relay UEs for a dual connectivity configuration for communication with the first network entity and a second network entity. The dual connectivity configuration may include a primary connection with the first network entity and a secondary connection with the second network entity. For example, 2002 may be performed by the dual connectivity component 2340 in FIG. 23. Referring to FIGS. 14 and 15, at 1418/1514, the first network entity 1406/1506 may receive, from a remote UE 1402/1502, an indication of one or more relay UEs 1404/1504 for a dual connectivity configuration for communication with the first network entity and a second network entity.

At 2004, the first network entity may select, based at least on the received indication, one of the one or more relay UEs for the secondary connection. For example, 2004 may be performed by the dual connectivity component 2340 in FIG. 23.

At 2006, the first network entity may prepare the secondary connection with the second network entity for connectivity with the remote UE via the one of the one or more relay UEs. For example, 2006 may be performed by the dual connectivity component 2340 in FIG. 23. Referring to FIGS. 14 and 15, at 1420/1516, the first network entity 1406/1506 may prepare the secondary connection with the second network entity 1408/1508 for connectivity with the remote UE 1402/1502 via the one of the one or more relay UEs 1404/1504.

At 2008, the first network entity may transmit, to the remote UE, a configuration for establishing the secondary connection with the second network entity via the one of the one or more relay UEs. For example, 2008 may be performed by the dual connectivity component 2340 in FIG. 23. Referring to FIGS. 14 and 15, at 1422/1518, the first network entity 1406/1506 may transmit, to the remote UE 1402/1502, a configuration for establishing the secondary connection with the second network entity 1408/1508 via the one of the one or more relay UEs 1404/1504.

FIG. 21 is a flowchart 2100 of a method of wireless communication. The method may be performed by a base station/master node/first network entity (e.g., the base station 102/180/310; the master node 1406/1506; the apparatus 2302). At 2106, the first network entity may receive, from a remote UE, an indication of one or more relay UEs for a dual connectivity configuration for communication with the first network entity and a second network entity. The dual connectivity configuration may include a primary connection with the first network entity and a secondary connection with the second network entity. For example, 2106 may be performed by the dual connectivity component 2340 in FIG. 23. Referring to FIGS. 14 and 15, at 1418/1514, the first network entity 1406/1506 may receive, from a remote UE 1402/1502, an indication of one or more relay UEs 1404/1504 for a dual connectivity configuration for communication with the first network entity and a second network entity.

At 2108, the first network entity may select, based at least on the received indication, one of the one or more relay UEs for the secondary connection. For example, 2108 may be performed by the dual connectivity component 2340 in FIG. 23.

At 2110, the first network entity may prepare the secondary connection with the second network entity for connectivity with the remote UE via the one of the one or more relay UEs. For example, 2110 may be performed by the dual connectivity component 2340 in FIG. 23. Referring to FIGS. 14 and 15, at 1420/1516, the first network entity 1406/1506 may prepare the secondary connection with the second network entity 1408/1508 for connectivity with the remote UE 1402/1502 via the one of the one or more relay UEs 1404/1504.

At 2112, the first network entity may transmit, to the remote UE, a configuration for establishing the secondary connection with the second network entity via the one of the one or more relay UEs. For example, 2112 may be performed by the dual connectivity component 2340 in FIG. 23. Referring to FIGS. 14 and 15, at 1422/1518, the first network entity 1406/1506 may transmit, to the remote UE 1402/1502, a configuration for establishing the secondary connection with the second network entity 1408/1508 via the one of the one or more relay UEs 1404/1504.

In one configuration, the primary connection with the remote UE may include a direct connection or a relayed connection.

In one configuration, at 2104, the first network entity may transmit, to the remote UE, a list of network entities suitable for the secondary connection in a SIB or an RRC message. For example, 2104 may be performed by the dual connectivity component 2340 in FIG. 23.

In one configuration, at 2102, the first network entity may transmit, to the remote UE, an indication of the dual connectivity configuration. For example, 2102 may be performed by the dual connectivity component 2340 in FIG. 23.

In one configuration, the indication of the one or more relay UEs for the dual connectivity configuration may be received from the remote UE in an RRC message.

In one configuration, the configuration for establishing the secondary connection may be transmitted to the remote UE in an RRC message.

In one configuration, the first network entity may be a master node and the second network entity may be a secondary node.

In one configuration, to prepare the secondary connection, at 2110a, the first network entity may transmit a secondary connection configuration to the second network entity. For example, 2110a may be performed by the dual connectivity component 2340 in FIG. 23. Referring to FIGS. 14 and 15, at 1420/1516, the first network entity 1406/1506 may transmit a secondary connection configuration to the second network entity 1408/1508.

At 2110b, the first network entity may receive a confirmation of the secondary connection confirmation from the second network entity. For example, 2110b may be performed by the dual connectivity component 2340 in FIG. 23. Referring to FIGS. 14 and 15, at 1420/1516, the first network entity 1406/1506 may receive a confirmation of the secondary connection confirmation from the second network entity 1408/1508.

In one configuration, the secondary connection may include a new local link or a previously existing link between the remote UE and the one of the one or more relay UEs.

In one configuration, the new local link or the previously existing local link may include one of a sidelink, a peer-to-peer communication link, a device-to-device communication link, a Bluetooth link, or a Wi-Fi link.

In one configuration, a relaying connection configuration for the secondary connection may be transmitted from the second network entity to the relay UE.

In one configuration, at 2114, the first network entity may communicate with the remote UE via one or more first bearers for the primary connection. For example, 2114 may be performed by the dual connectivity component 2340 in FIG. 23. Referring to FIGS. 14 and 15, at 1436a/1532a, the first network entity 1406/1506 may communicate with the remote UE 1402/1502 via one or more first bearers for the primary connection.

Figure 22:
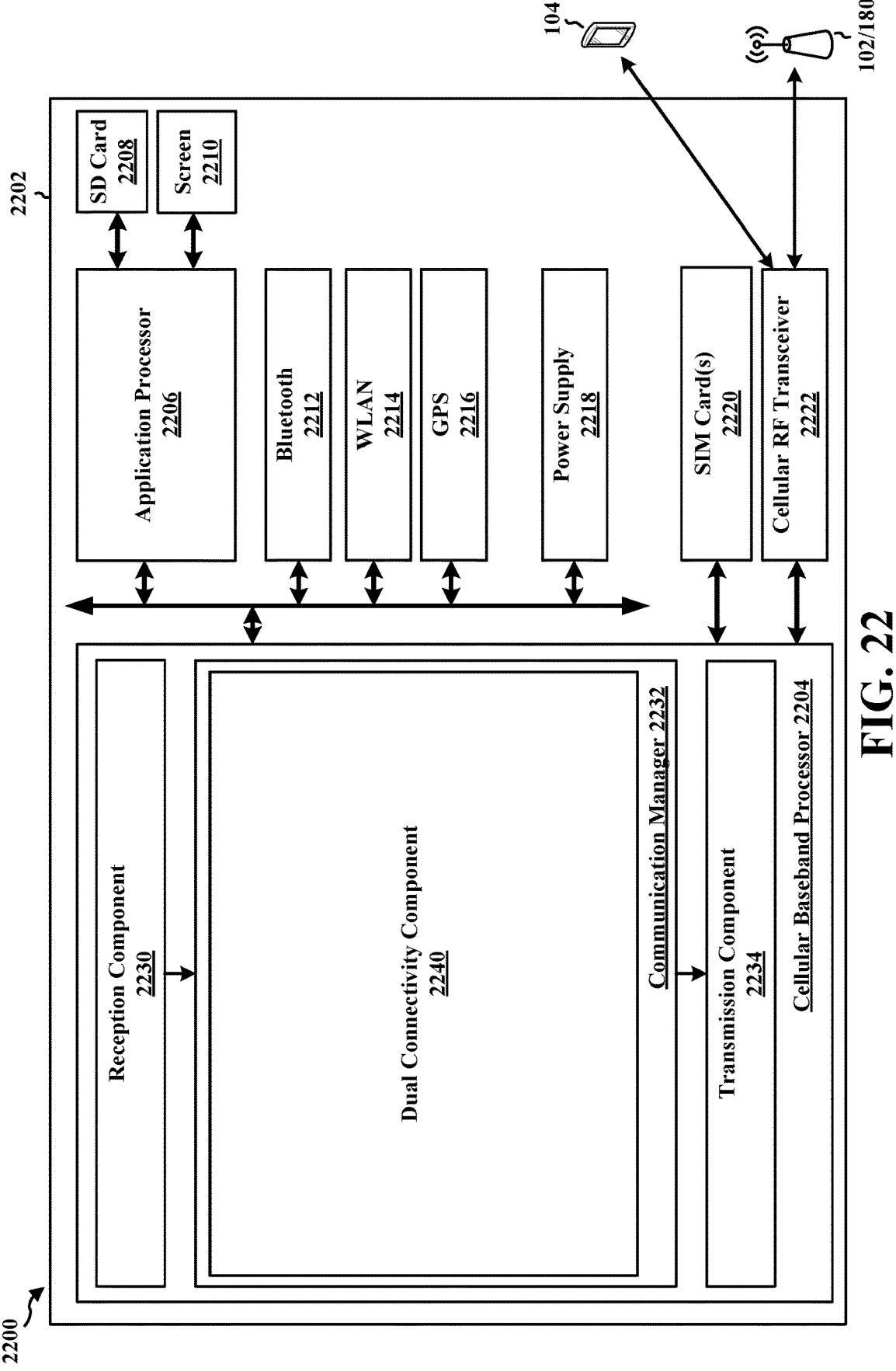
FIG. 22 is a diagram illustrating an example of a hardware implementation for an example apparatus.

FIG. 22 is a diagram 2200 illustrating an example of a hardware implementation for an apparatus 2202. The apparatus 2202 may be a UE, a component of a UE, or may implement UE functionality. In some aspects, the apparatus 2202 may include a cellular baseband processor 2204 (also referred to as a modem) coupled to a cellular RF transceiver 2222. In some aspects, the apparatus 2202 may further include one or more subscriber identity modules (SIM) cards 2220, an application processor 2206 coupled to a secure digital (SD) card 2208 and a screen 2210, a Bluetooth module 2212, a wireless local area network (WLAN) module 2214, a Global Positioning System (GPS) module 2216, or a power supply 2218. The cellular baseband processor 2204 communicates through the cellular RF transceiver 2222 with the UE 104 and/or BS 102/180. The cellular baseband processor 2204 may include a computer-readable medium/memory. The computer-readable medium/memory may be non-transitory. The cellular baseband processor 2204 is responsible for general processing, including the execution of software stored on the computer-readable medium/memory. The software, when executed by the cellular baseband processor 2204, causes the cellular baseband processor 2204 to perform the various functions described supra. The computer-readable medium/memory may also be used for storing data that is manipulated by the cellular baseband processor 2204 when executing software. The cellular baseband processor 2204 further includes a reception component 2230, a communication manager 2232, and a transmission component 2234. The communication manager 2232 includes the one or more illustrated components. The components within the communication manager 2232 may be stored in the computer-readable medium/memory and/or configured as hardware within the cellular baseband processor 2204. The cellular baseband processor 2204 may be a component of the UE 350 and may include the memory 360 and/or at least one of the TX processor 368, the RX processor 356, and the controller/processor 359. In one configuration, the apparatus 2202 may be a modem chip and include just the baseband processor 2204, and in another configuration, the apparatus 2202 may be the entire UE (e.g., see 350 of FIG. 3) and include the additional modules of the apparatus 2202.

The communication manager 2232 may include a dual connectivity component 2240 that may be configured to receive, from the first network entity, an indication of the dual connectivity configuration, e.g., as described in connection with 1902 in FIG. 19. The dual connectivity component 2240 may be configured to detect one or more relay UEs for a dual connectivity configuration for communication with a first network entity and a second network entity, the dual connectivity configuration including a primary connection with the first network entity and a secondary connection with the second network entity, e.g., as described in connection with 1802 in FIGS. 18 and 1904 in FIG. 19. The dual connectivity component 2240 may be configured to transmit, to the first network entity, an indication of the detected one or more relay UEs, e.g., as described in connection with 1906 in FIG. 19. The dual connectivity component 2240 may be configured to receive, from the first network entity, a configuration for establishing the secondary connection via one of the one or more relay UEs, e.g., as described in connection with 1804 in FIGS. 18 and 1908 in FIG. 19. The dual connectivity component 2240 may be configured to establish the secondary connection via the one of the one or more relay UEs for communication with the second network entity, e.g., as described in connection with 1806 in FIGS. 18 and 1910 in FIG. 19. The dual connectivity component 2240 may be configured to configure one or more second bearers for the secondary connection via the one of the one or more relay UEs, the one or more second bearers supporting data transmission via the secondary connection, e.g., as described in connection with 1808 in FIGS. 18 and 1912 in FIG. 19. The dual connectivity component 2240 may be configured to communicate with the first network entity via one or more first bearers for the primary connection, e.g., as described in connection with 1914 in FIG. 19. The dual connectivity component 2240 may be configured to communicate with the second network entity via the one or more second bearers for the secondary connection, e.g., as described in connection with 1916 in FIG. 19. The dual connectivity component 2240 may be configured to transmit a same PDU via one of the one or more first bearers for the primary connection and via one of the one or more second bearers for the secondary connection, e.g., as described in connection with 1918 in FIG. 19.

The apparatus may include additional components that perform each of the blocks of the algorithm in the flowcharts of FIGS. 14-16, 18, and 19. As such, each block in the flowcharts of FIGS. 14-16, 18, and 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2202 may include a variety of components configured for various functions. In one configuration, the apparatus 2202, and in particular the cellular baseband processor 2204, includes means for detecting one or more relay UEs for a dual connectivity configuration for communication with a first network entity and a second network entity. The dual connectivity configuration may include a primary connection with the first network entity and a secondary connection with the second network entity. The apparatus 2202 may include means for receiving, from the first network entity, a configuration for establishing the secondary connection via one of the one or more relay UEs. The apparatus 2202 may include means for establishing the secondary connection via the one of the one or more relay UEs for communication with the second network entity. The apparatus 2202 may include means for configuring one or more second bearers for the secondary connection via the one of the one or more relay UEs, the one or more second bearers supporting data transmission via the secondary connection.

In one configuration, the primary connection with the first network entity may include a direct connection or a relayed connection. In one configuration, the detection of the one or more relay UEs may be based on a list of network entities suitable for the secondary connection. In one configuration, the list of network entities suitable for the secondary connection may be preconfigured, or may be received from the first network entity in a SIB or an RRC message. In one configuration, the apparatus 2202 may further include means for receiving, from the first network entity, an indication of the dual connectivity configuration. In one configuration, the apparatus 2202 may further include means for transmitting, to the first network entity, an indication of the detected one or more relay UEs. In one configuration, the indication of the detected one or more relay UEs may be transmitted to the first network entity in an RRC message. In one configuration, the configuration for establishing the secondary connection may be received from the first network entity in an RRC message. In one configuration, the first network entity may be a master node and the second network entity may be a secondary node. In one configuration, the secondary connection may include a new local link or a previously existing local link with the one of the one or more relay UEs. In one configuration, if the secondary connection includes the previously existing link, the remote UE may configure the previously existing link to support a relaying capability. In one configuration, the new local link or the previously existing local link may include one of a sidelink, a peer-to-peer communication link, a device-to-device communication link, a Bluetooth link, or a Wi-Fi link. In one configuration, the apparatus 2202 may further include means for communicating with the first network entity via one or more first bearers for the primary connection. The apparatus 2202 may further include means for communicating with the second network entity via the one or more second bearers for the secondary connection. In one configuration, the apparatus 2202 may further include means for transmitting a same PDU via one of the one or more first bearers for the primary connection and via one of the one or more second bearers for the secondary connection.

The means may be one or more of the components of the apparatus 2202 configured to perform the functions recited by the means. As described supra, the apparatus 2202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 23:
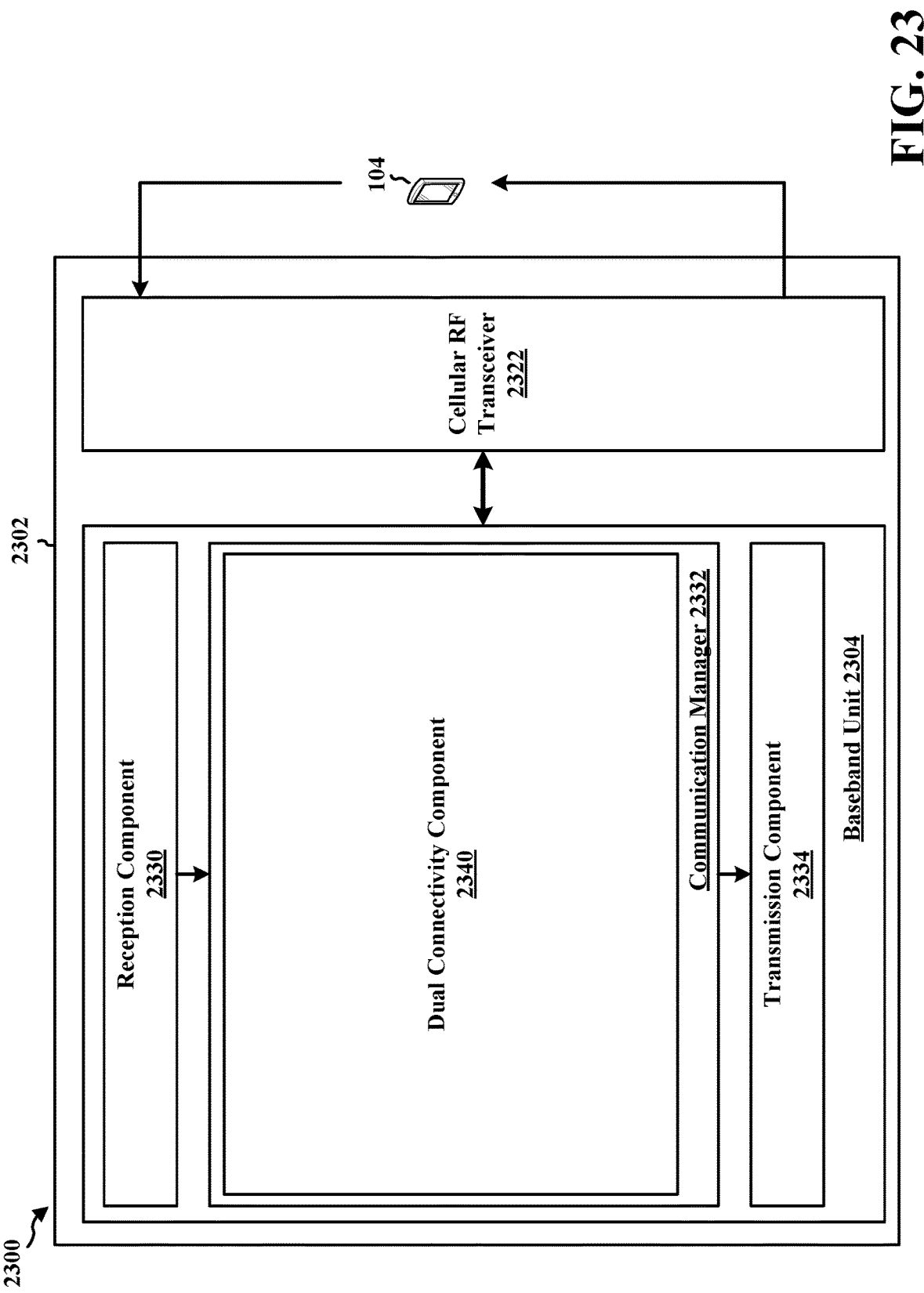
FIG. 23 is a diagram illustrating an example of a hardware implementation for an example apparatus.

FIG. 23 is a diagram 2300 illustrating an example of a hardware implementation for an apparatus 2302. The apparatus 2302 may be a base station, a component of a base station, or may implement base station functionality. In some aspects, the apparatus 2202 may include a baseband unit 2304. The baseband unit 2304 may communicate through a cellular RF transceiver 2322 with the UE 104. The baseband unit 2304 may include a computer-readable medium/memory. The baseband unit 2304 is responsible for general processing, including the execution of software stored on the computer-readable medium/memory. The software, when executed by the baseband unit 2304, causes the baseband unit 2304 to perform the various functions described supra. The computer-readable medium/memory may also be used for storing data that is manipulated by the baseband unit 2304 when executing software. The baseband unit 2304 further includes a reception component 2330, a communication manager 2332, and a transmission component 2334. The communication manager 2332 includes the one or more illustrated components. The components within the communication manager 2332 may be stored in the computer-readable medium/memory and/or configured as hardware within the baseband unit 2304. The baseband unit 2304 may be a component of the base station 310 and may include the memory 376 and/or at least one of the TX processor 316, the RX processor 370, and the controller/processor 375.

The communication manager 2332 may include a dual connectivity component 2340 that may be configured to transmit, to the remote UE, an indication of the dual connectivity configuration, e.g., as described in connection with 2102 in FIG. 21. The dual connectivity component 2340 that may be configured to transmit, to the remote UE, a list of network entities suitable for the secondary connection in a SIB or an RRC message, e.g., as described in connection with 2104 in FIG. 21. The dual connectivity component 2340 that may be configured to receive, from a remote UE, an indication of one or more relay UEs for a dual connectivity configuration for communication with the first network entity and a second network entity, the dual connectivity configuration including a primary connection with the first network entity and a secondary connection with the second network entity, e.g., as described in connection with 2002 in FIGS. 20 and 2106 in FIG. 21. The dual connectivity component 2340 that may be configured to select, based at least on the received indication, one of the one or more relay UEs for the secondary connection, e.g., as described in connection with 2004 in FIGS. 20 and 2108 in FIG. 21. The dual connectivity component 2340 that may be configured to prepare the secondary connection with the second network entity for connectivity with the remote UE via the one of the one or more relay UEs, e.g., as described in connection with 2006 in FIGS. 20 and 2110 in FIG. 21. The dual connectivity component 2340 that may be configured to transmit a secondary connection configuration to the second network entity, e.g., as described in connection with 2110a in FIG. 21. The dual connectivity component 2340 that may be configured to receive a confirmation of the secondary connection confirmation from the second network entity, e.g., as described in connection with 2110b in FIG. 21. The dual connectivity component 2340 that may be configured to transmit, to the remote UE, a configuration for establishing the secondary connection with the second network entity via the one of the one or more relay UEs, e.g., as described in connection with 2008 in FIGS. 20 and 2112 in FIG. 21. The dual connectivity component 2340 that may be configured to communicate with the remote UE via one or more first bearers for the primary connection, e.g., as described in connection with 2114 in FIG. 21.

The apparatus may include additional components that perform each of the blocks of the algorithm in the flowcharts of FIGS. 14-16, 19, and 20. As such, each block in the flowcharts of FIGS. 14-16, 19, and 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2302 may include a variety of components configured for various functions. In one configuration, the apparatus 2302, and in particular the baseband unit 2304, includes means for receiving, from a remote UE, an indication of one or more relay UEs for a dual connectivity configuration for communication with the first network entity and a second network entity, the dual connectivity configuration including a primary connection with the first network entity and a secondary connection with the second network entity. The apparatus 2302 may include means for selecting, based at least on the received indication, one of the one or more relay UEs for the secondary connection. The apparatus 2302 may include means for preparing the secondary connection with the second network entity for connectivity with the remote UE via the one of the one or more relay UEs. The apparatus 2302 may include means for transmitting, to the remote UE, a configuration for establishing the secondary connection with the second network entity via the one of the one or more relay UEs.

In one configuration, the primary connection with the remote UE may include a direct connection or a relayed connection. In one configuration, the apparatus 2302 may include means for transmitting, to the remote UE, a list of network entities suitable for the secondary connection in a SIB or an RRC message. In one configuration, the apparatus 2302 may include means for transmitting, to the remote UE, an indication of the dual connectivity configuration. In one configuration, the indication of the one or more relay UEs for the dual connectivity configuration may be received from the remote UE in an RRC message. In one configuration, the configuration for establishing the secondary connection may be transmitted to the remote UE in an RRC message. In one configuration, the first network entity may be a master node and the second network entity may be a secondary node. In one configuration, to prepare the secondary connection, the apparatus 2302 may include means for transmitting a secondary connection configuration to the second network entity. The apparatus 2302 may include means for receiving a confirmation of the secondary connection confirmation from the second network entity. In one configuration, the secondary connection may include a new local link or a previously existing link between the remote UE and the one of the one or more relay UEs. In one configuration, the new local link or the previously existing local link may include one of a sidelink, a peer-to-peer communication link, a device-to-device communication link, a Bluetooth link, or a Wi-Fi link. In one configuration, a relaying connection configuration for the secondary connection may be transmitted from the second network entity to the relay UE. In one configuration, the apparatus 2302 may include means for communicating with the remote UE via one or more first bearers for the primary connection.

The means may be one or more of the components of the apparatus 2302 configured to perform the functions recited by the means. As described supra, the apparatus 2302 may include the TX Processor 316, the RX Processor 370, and the controller/processor 375. As such, in one configuration, the means may be the TX Processor 316, the RX Processor 370, and the controller/processor 375 configured to perform the functions recited by the means.

According to aspects described herein, a remote UE may detect one or more relay UEs for a dual connectivity configuration for communication with a first network entity and a second network entity. The dual connectivity configuration may include a primary connection with the first network entity and a secondary connection with the second network entity. The remote UE may receive, from the first network entity, a configuration for establishing the secondary connection via one of the one or more relay UEs based on a decision at the first network entity. The remote UE may establish the secondary connection via the one of the one or more relay UEs for communication with the second network entity. The remote UE may configure one or more second bearers for the secondary connection via the one of the one or more relay UEs. The one or more second bearers may support data transmission via the secondary connection. By leveraging both the UE-to-network relay and dual connectivity, coverage, throughput, and reliability associated with the wireless communication may be improved.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a remote UE including at least one processor coupled to a memory and configured to detect one or more relay UEs for a dual connectivity configuration for communication with a first network entity and a second network entity, the dual connectivity configuration including a primary connection with the first network entity and a secondary connection with the second network entity; receive, from the first network entity, a configuration for establishing the secondary connection via one of the one or more relay UEs; establish the secondary connection via the one of the one or more relay UEs for communication with the second network entity; and configure one or more second bearers for the secondary connection via the one of the one or more relay UEs, the one or more second bearers supporting data transmission via the secondary connection.

Aspect 2 is the apparatus of aspect 1, where the primary connection with the first network entity includes a direct connection or a relayed connection.

Aspect 3 is the apparatus of any of aspects 1 and 2, where the detection of the one or more relay UEs is based on a list of network entities suitable for the secondary connection.

Aspect 4 is the apparatus of aspect 3, where the list of network entities suitable for the secondary connection is preconfigured, or is received from the first network entity in a SIB or an RRC message.

Aspect 5 is the apparatus of any of aspects 1 to 4, the at least one processor being further configured to: receive, from the first network entity, an indication of the dual connectivity configuration.

Aspect 6 is the apparatus of any of aspects 1 to 5, the at least one processor being further configured to: transmit, to the first network entity, an indication of the detected one or more relay UEs.

Aspect 7 is the apparatus of aspect 6, where the indication of the detected one or more relay UEs is transmitted to the first network entity in an RRC message.

Aspect 8 is the apparatus of any of aspects 1 to 7, where the configuration for establishing the secondary connection is received from the first network entity in an RRC message.

Aspect 9 is the apparatus of any of aspects 1 to 8, where the first network entity is a master node and the second network entity is a secondary node.

Aspect 10 is the apparatus of any of aspects 1 to 9, where the secondary connection includes a new local link or a previously existing local link with the one of the one or more relay UEs.

Aspect 11 is the apparatus of aspect 10, where, if the secondary connection includes the previously existing link, the at least one processor is further configured to configure the previously existing link to support a relaying capability.

Aspect 12 is the apparatus of any of aspects 10 and 11, where the new local link or the previously existing local link includes one of a sidelink, a peer-to-peer communication link, a device-to-device communication link, a Bluetooth link, or a Wi-Fi link.

Aspect 13 is the apparatus of any of aspects 1 to 12, the at least one processor being further configured to: communicate with the first network entity via one or more first bearers for the primary connection; and communicate with the second network entity via the one or more second bearers for the secondary connection.

Aspect 14 is the apparatus of aspect 13, the at least one processor being further configured to: transmit a same PDU via one of the one or more first bearers for the primary connection and via one of the one or more second bearers for the secondary connection.

Aspect 15 is the apparatus of any of aspects 1 to 14, further including a transceiver coupled to the at least one processor.

Aspect 16 is an apparatus for wireless communication at a first network entity including at least one processor coupled to a memory and configured to receive, from a remote UE, an indication of one or more relay UEs for a dual connectivity configuration for communication with the first network entity and a second network entity, the dual connectivity configuration including a primary connection with the first network entity and a secondary connection with the second network entity; select, based at least on the received indication, one of the one or more relay UEs for the secondary connection; prepare the secondary connection with the second network entity for connectivity with the remote UE via the one of the one or more relay UEs; and transmit, to the remote UE, a configuration for establishing the secondary connection with the second network entity via the one of the one or more relay UEs.

Aspect 17 is the apparatus of aspect 16, where the primary connection with the remote UE includes a direct connection or a relayed connection.

Aspect 18 is the apparatus of any of aspects 16 and 17, the at least one processor being further configured to: transmit, to the remote UE, a list of network entities suitable for the secondary connection in a SIB or an RRC message.

Aspect 19 is the apparatus of any of aspects 16 to 18, the at least one processor being further configured to: transmit, to the remote UE, an indication of the dual connectivity configuration.

Aspect 20 is the apparatus of any of aspects 16 to 19, where the indication of the one or more relay UEs for the dual connectivity configuration is received from the remote UE in an RRC message.

Aspect 21 is the apparatus of any of aspects 16 to 20, where the configuration for establishing the secondary connection is transmitted to the remote UE in an RRC message.

Aspect 22 is the apparatus of any of aspects 16 to 21, where the first network entity is a master node and the second network entity is a secondary node.

Aspect 23 is the apparatus of any of aspects 16 to 22, where to prepare the secondary connection, the at least one processor is further configured to: transmit a secondary connection configuration to the second network entity; and receive a confirmation of the secondary connection confirmation from the second network entity.

Aspect 24 is the apparatus of any of aspects 16 to 23, where the secondary connection includes a new local link or a previously existing link between the remote UE and the one of the one or more relay UEs.

Aspect 25 is the apparatus of aspect 24, where the new local link or the previously existing local link includes one of a sidelink, a peer-to-peer communication link, a device-to-device communication link, a Bluetooth link, or a Wi-Fi link.

Aspect 26 is the apparatus of any of aspects 16 to 25, where a relaying connection configuration for the secondary connection is transmitted from the second network entity to the relay UE.

Aspect 27 is the apparatus of any of aspects 16 to 26, the at least one processor being further configured to: communicate with the remote UE via one or more first bearers for the primary connection.

Aspect 28 is the apparatus of any of aspects 16 to 27, further including a transceiver coupled to the at least one processor.

Aspect 29 is a method of wireless communication for implementing any of aspects 1 to 28.

Aspect 30 is an apparatus for wireless communication including means for implementing any of aspects 1 to 28.

Aspect 31 is a computer-readable medium storing computer executable code, where the code when executed by a processor causes the processor to implement any of aspects 1 to 28.

What is claimed is:

1. An apparatus for wireless communication at a remote user equipment (UE), comprising:

a memory; and at least one processor coupled to the memory and configured to:

detect one or more relay UEs for a secondary connection with a second network entity in a dual connectivity configuration for communication with a first network entity and the second network entity, the dual connectivity configuration including a primary connection with the first network entity and the secondary connection with the second network entity;

receive, from the first network entity, a configuration for establishing the secondary connection with the second network entity via one of the one or more relay UEs;

establish the secondary connection via the one of the one or more relay UEs for communication with the second network entity based on the received configuration for establishing the secondary connection; and configure one or more second bearers for the secondary connection via the one of the one or more relay UEs, the one or more second bearers supporting data transmission via the secondary connection.

2. The apparatus of claim 1, wherein the primary connection with the first network entity comprises a direct connection or a relayed connection.

3. The apparatus of claim 1, wherein the detection of the one or more relay UEs is based on a list of network entities suitable for the secondary connection.

4. The apparatus of claim 3, wherein the list of network entities suitable for the secondary connection is preconfigured, or is received from the first network entity in a system information block (SIB) or a radio resource control (RRC) message.

5. The apparatus of claim 1, the at least one processor being further configured to:
   receive, from the first network entity, an indication of dual connectivity.

6. The apparatus of claim 1, the at least one processor being further configured to:
   transmit, to the first network entity, an indication of the detected one or more relay UEs.

7. The apparatus of claim 6, wherein the indication of the detected one or more relay UEs is transmitted to the first network entity in a radio resource control (RRC) message.

8. The apparatus of claim 1, wherein the configuration for establishing the secondary connection is received from the first network entity in a radio resource control (RRC) message.

9. The apparatus of claim 1, wherein the first network entity is a master node and the second network entity is a secondary node.

10. The apparatus of claim 1, wherein the secondary connection comprises a new local link or a previously existing local link with the one of the one or more relay UEs.

11. The apparatus of claim 10, wherein, if the secondary connection comprises the previously existing link, the at least one processor is further configured to configure the previously existing link to support a relaying capability.

12. The apparatus of claim 10, wherein the new local link or the previously existing local link comprises one of a sidelink, a peer-to-peer communication link, a device-to-device communication link, a Bluetooth link or a Wi-Fi link.

13. The apparatus of claim 1, the at least one processor being further configured to:
   communicate with the first network entity via one or more first bearers for the primary connection; and
   communicate with the second network entity via the one or more second bearers for the secondary connection.

14. The apparatus of claim 13, the at least one processor being further configured to:
   transmit a same protocol data unit (PDU) via one of the one or more first bearers for the primary connection and via one of the one or more second bearers for the secondary connection.

15. The apparatus of claim 1, further comprising a transceiver coupled to the at least one processor.

16. A method of wireless communication at a remote user equipment (UE), comprising:
   detecting one or more relay UEs for a dual connectivity configuration for communication with a first network entity and a second network entity, the dual connectivity configuration including a primary connection with the first network entity and a secondary connection with the second network entity;

receiving, from the first network entity, a configuration for establishing the secondary connection via one of the one or more relay UEs;
   establishing the secondary connection via the one of the one or more relay UEs for communication with the second network entity; and
   configuring one or more second bearers for the secondary connection via the one of the one or more relay UEs, the one or more second bearers supporting data transmission via the secondary connection.

17. An apparatus for wireless communication at a first network entity, comprising:
   a memory; and
   at least one processor coupled to the memory and configured to:
      receive, from a remote user equipment (UE), an indication of one or more relay UEs for a secondary connection with a second network entity in a dual connectivity configuration for communication with the first network entity and the second network entity, the dual connectivity configuration including a primary connection with the first network entity and the secondary connection with the second network entity;
      select, based at least on the received indication, one of the one or more relay UEs for the secondary connection;
      transmit, to the second network entity, an indication to prepare the second network entity for the secondary connection with the remote UE via the one of the one or more relay UEs; and
      transmit, to the remote UE, a configuration for establishing the secondary connection with the second network entity via the one of the one or more relay UEs.

18. The apparatus of claim 17, wherein the primary connection with the remote UE comprises a direct connection or a relayed connection.

19. The apparatus of claim 17, the at least one processor being further configured to:
   transmit, to the remote UE, a list of network entities suitable for the secondary connection in a system information block (SIB) or a radio resource control (RRC) message.

20. The apparatus of claim 17, the at least one processor being further configured to:
   transmit, to the remote UE, an indication of the dual connectivity configuration.

21. The apparatus of claim 17, wherein the indication of the one or more relay UEs for the dual connectivity configuration is received from the remote UE in a radio resource control (RRC) message.

22. The apparatus of claim 17, wherein the configuration for establishing the secondary connection is transmitted to the remote UE in a radio resource control (RRC) message.

23. The apparatus of claim 17, wherein the first network entity is a master node and the second network entity is a secondary node.

24. The apparatus of claim 17, wherein to prepare the secondary connection, the at least one processor is further configured to:
   transmit a secondary connection configuration to the second network entity; and
   receive a confirmation of the secondary connection confirmation from the second network entity.

25. The apparatus of claim 17, wherein the secondary connection comprises a new local link or a previously existing link between the remote UE and the one of the one or more relay UEs.

26. The apparatus of claim 25, wherein the new local link or the previously existing local link comprises one of a sidelink, a peer-to-peer communication link, a device-to-device communication link, a Bluetooth link, or a Wi-Fi link.

27. The apparatus of claim 17, wherein a relaying connection configuration for the secondary connection is transmitted from the second network entity to the relay UE.

28. The apparatus of claim 17, the at least one processor being further configured to:

communicate with the remote UE via one or more first bearers for the primary connection.

29. The apparatus of claim 17, further comprising a transceiver coupled to the at least one processor.

30. A method of wireless communication at a first network entity, comprising:

receiving, from a remote user equipment (UE), an indication of one or more relay UEs for a dual connectivity configuration for communication with the first network entity and a second network entity, the dual connectivity configuration including a primary connection with the first network entity and a secondary connection with the second network entity;

selecting, based at least on the received indication, one of the one or more relay UEs for the secondary connection;

preparing the secondary connection with the second network entity for connectivity with the remote UE via the one of the one or more relay UEs; and transmitting, to the remote UE, a configuration for establishing the secondary connection with the second network entity via the one of the one or more relay UEs.

* * * * *